US010571550B2

(12) United States Patent
Theurer et al.

(10) Patent No.: US 10,571,550 B2
(45) Date of Patent: Feb. 25, 2020

(54) SIGNAL CORRECTION FOR ENVIRONMENTAL DISTORTION

(71) Applicant: University of Alaska Fairbanks, Fairbanks, AK (US)

(72) Inventors: Timothy Theurer, Fairbanks, AK (US); William Bristow, Fairbanks, AK (US)

(73) Assignee: UNIVERSITY OF ALASKA FAIRBANKS, Fairbanks, AK (US)

( * ) Notice: Subject to any disclaimer, the term of this patent is extended or adjusted under 35 U.S.C. 154(b) by 572 days.

(21) Appl. No.: 14/622,327

(22) Filed: Feb. 13, 2015

(65) Prior Publication Data

US 2016/0238695 A1    Aug. 18, 2016

(51) Int. Cl.
*G01S 7/292* (2006.01)
*G01S 7/41* (2006.01)
(Continued)

(52) U.S. Cl.
CPC ............ *G01S 7/2923* (2013.01); *G01S 7/414* (2013.01); *G01S 13/0218* (2013.01);
(Continued)

(58) Field of Classification Search
CPC ...... G01S 7/023; G01S 7/2921; G01S 7/2923; G01S 7/40; G01S 7/414; G01S 13/0218; G01S 13/0227; G01S 2013/0245; G01S 2013/0218; G01S 2013/0227; G01S 2013/0236; G01S 2013/0254; G01S 7/2925; G01S 7/2926; G01S 7/2928; G01S 7/418; G01S 13/526; G01S 13/53; G01S 13/534; G01S 13/95; G01S 13/951; G01S 13/958
See application file for complete search history.

(56) References Cited

U.S. PATENT DOCUMENTS 4,533,915 A * 8/1985 Lucchi .................... G01S 13/52
342/26 B
5,247,303 A * 9/1993 Cornelius ............... G01S 13/20
342/26 D
(Continued)

OTHER PUBLICATIONS

Parkinson et al., "Why Do We Need Digidarn—A Global Network of Digital Superdarn Radars?" January 2006, Researchgate, pp. 1-15.*

*Primary Examiner* — Bernarr E Gregory
*Assistant Examiner* — Daniel P Malley, Sr.
(74) *Attorney, Agent, or Firm* — Ballard Spahr LLP

(57) ABSTRACT

Methods and systems for correcting environmental distortion are disclosed. An example method can comprise receiving a first plurality of signals sampled in space at a first time and determining a first plurality of correction factors based on the first plurality of signals. The first plurality of correction factors can be configured to correct environmental distortion in the first plurality of signals. The first plurality of signals can be corrected by applying the first plurality of correction factors to the first plurality of signals thereby generating a corrected first plurality of signals. The corrected first plurality of signals can be provided. The method can be repeated for one or more additional pluralities of signals sampled in space at times subsequent to the first time with corresponding additional pluralities of correction factors. Each additional plurality of correction factors can be unique to a corresponding plurality of signals.

17 Claims, 19 Drawing Sheets

(51) Int. Cl.
  *G01S 13/02* (2006.01)
  *G01S 13/88* (2006.01)
  *G01S 13/95* (2006.01)

(52) U.S. Cl.
  CPC ............ *G01S 13/88* (2013.01); *G01S 13/951* (2013.01); *G01S 13/958* (2013.01)

(56) References Cited

U.S. PATENT DOCUMENTS

| | | | | |
|---|---|---|---|---|
| 5,262,782 | A * | 11/1993 | Rubin | G01S 13/951 342/26 D |
| 5,309,161 | A * | 5/1994 | Urkowitz | G01S 13/526 342/111 |
| 5,469,168 | A * | 11/1995 | Anderson | G01S 13/951 342/192 |
| 5,510,796 | A * | 4/1996 | Applebaum | H01Q 3/26 342/159 |
| 5,706,013 | A * | 1/1998 | Melvin | G01S 7/2923 342/159 |
| 6,037,898 | A * | 3/2000 | Parish | H01Q 3/267 342/174 |
| 6,172,642 | B1 * | 1/2001 | DiDomenico | G01S 7/4017 342/368 |
| 2003/0210179 | A1 * | 11/2003 | Dizaji | G01S 7/292 342/159 |
| 2004/0032364 | A1 * | 2/2004 | Saucier | G01S 3/023 342/174 |
| 2009/0278727 | A1 * | 11/2009 | Inaba | G01S 7/021 342/112 |
| 2010/0221997 | A1 * | 9/2010 | Craig | H04B 7/18513 455/12.1 |

* cited by examiner

SIGNAL CORRECTION FOR ENVIRONMENTAL DISTORTION

SUMMARY

It is to be understood that both the following general description and the following detailed description are exemplary and explanatory only and are not restrictive. Provided are methods and systems for correcting environmental distortion. An example method can comprise receiving a first plurality of signals sampled in space at a first time and determining a first plurality of correction factors based on the first plurality of signals. The first plurality of correction factors can be configured to correct environmental distortion in the first plurality of signals. An example method can comprise correcting the first plurality of signals by applying the first plurality of correction factors to the first plurality of signals thereby generating a corrected first plurality of signals. The corrected first plurality of signals can be provided (e.g., to local storage, signal processing elements, a remote device). The method can be repeated for one or more additional pluralities of signals sampled in space at times subsequent to the first time with corresponding additional pluralities of correction factors. Each additional plurality of correction factors can be unique to a corresponding plurality of signals of the one or more additional plurality of signals.

In another aspect, an example method can comprise transmitting a signal and receiving N×M signals reflected based on the transmitted signal. The N×M signals can be received at N points in space and M points in time. Each M point in time can correspond to a reflection of the signal from a different volume of space. The example method can comprise determining N×M correction factors comprising N correction factors for each of the M points in time. The N×M correction factors can be configured to correct for time-varying environmental distortion specific to each of the M volumes of space and that produces phase and amplitude variations between each of the N points in space. The example method can comprise correcting the N×M signals by applying the N×M correction factors to corresponding signals of the N×M signals thereby generating a corrected set of signals, which can be provided (e.g., to local storage, signal processing elements, a remote device). The example method can be repeated thereby updating the N×M correction factors for each iteration based on N×M signals received during the iteration and one or more sets of N×M signals received prior to the corresponding iteration to adaptively compensate for time-varying environmental distortion of each iteration.

In another aspect, an example system can comprise at least two spatially separated antennas (e.g., N antennas) and a signal processor coupled to the at least two separated antennas. The signal processor can be configured for receiving N×M signals from a least a portion of the at least two spatially separated antennas. The N×M signals can be received at N points in space (e.g., at the N antennas) and M points in time. Each M point in time can correspond to a reflection of the signal from a different volume of space. The signal processor can be configured for determining N×M correction factors comprising N correction factors for each of the M points in time. The N×M correction factors can be configured to correct for time-varying environmental distortion specific to each of the M volumes of space and that produces phase and amplitude variations between each of the N points in space. The signal processor can further be configured for correcting the N×M signals by applying the N×M correction factors to corresponding signals of the N×M received signals thereby generating a corrected set of signals. The signal processor can be configured for providing the corrected set of signals (e.g., to local storage, signal processing elements, a remote device).

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
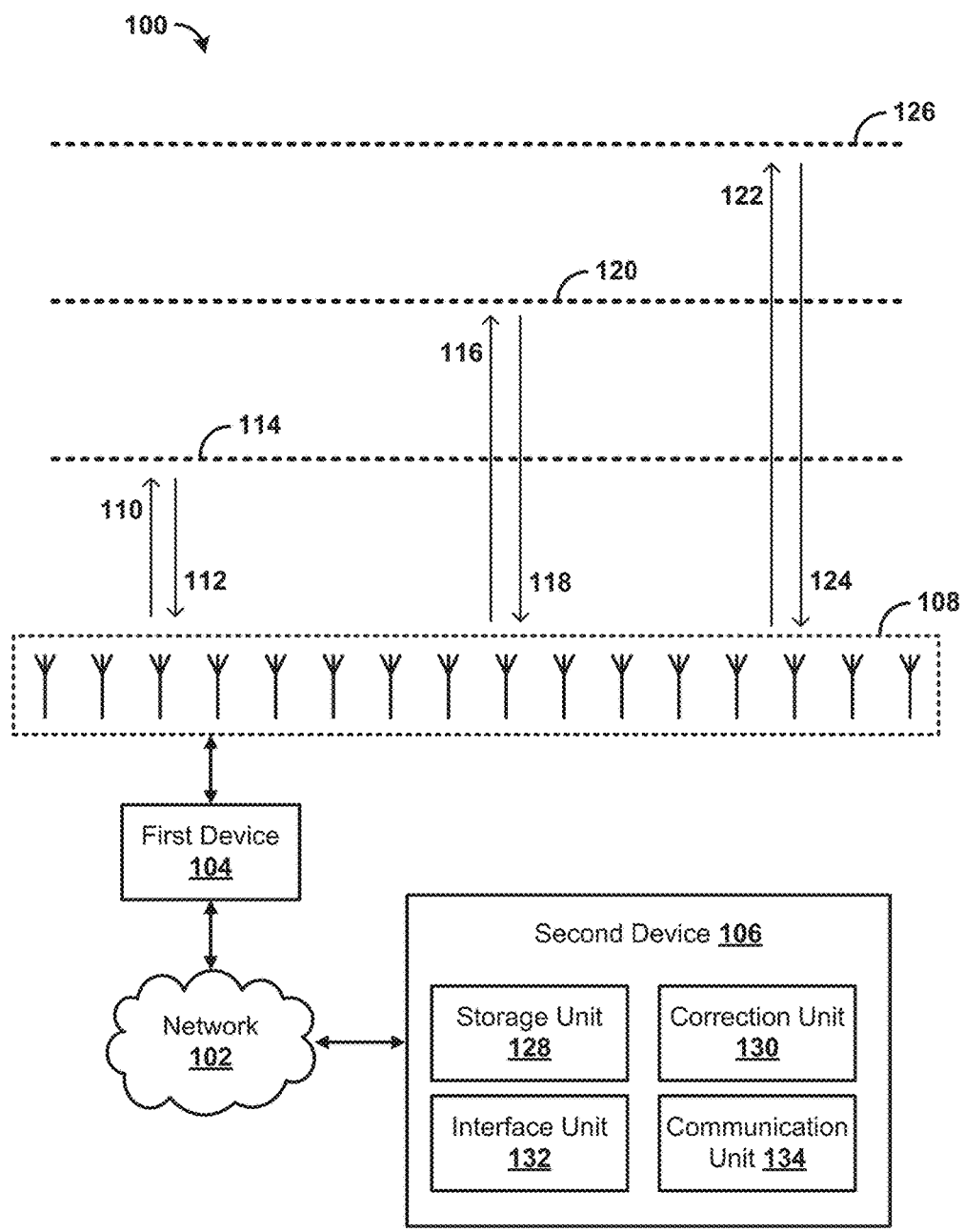
FIG. 1 is a block diagram illustrating various aspects of an exemplary system for correcting signals.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to signal correction. For example, a plurality of antennas, such as a phased antenna array can receive signals. The signals can be in response to a signal provided from one or more of the plurality of antennas and/or other source. The signals can be distorted due to environmental distortion. In an aspect, correction factors can be determined to correct the distortion. Additional signals can be received at latter times, corresponding to different range gates (e.g., distance from the antennas). The additional correction factors can be determined and applied to correct the additional signals.

FIG. 1 is a block diagram illustrating various aspects of an exemplary system 100 for correcting signals. One skilled in the art will appreciate that provided herein is a functional description and that the respective functions can be performed by software, hardware, or a combination of software and hardware.

In one aspect, system 100 can comprise a network 102. In one aspect, the network 102 can comprise a packet switched network (e.g., internet protocol based network), a non-packet switched network (e.g., quadrature amplitude modulation based network), and/or the like. The network 102 can comprise network adapters, switches, routers, modems, and the like connected through wireless links (e.g., radio frequency, satellite) and/or physical links (e.g., fiber optic cable, coaxial cable, Ethernet cable, or a combination thereof). The network 102 can comprise public networks, private networks, wide area networks (e.g., Internet), local area networks, and/or the like. In one aspect, the network 102 can be configured to provide communication from telephone, cellular, modem, and/or other electronic devices to and throughout the system 100. For example, the network 102 can be configured to communicatively couple one or more of a first device 104, a second device 106, and/or the like.

In an aspect, the system 100 can comprise one or more antennas 108. For example, the one or more antennas 108 can comprise at least two antennas. The one or more antennas 108 can be configured as a group of antennas. For example, the one or more antennas 108 can be arranged (e.g., located, spaced) to form an array of antennas 108. As a further example, the one or more antennas 108 can be configured as a phased array of antennas 108. The one or more antennas 108 can be at a fixed location (e.g., affixed to land) or can be moving. For example, the one or more antennas 108 can be located on an aircraft, boat, submarine, vehicle, satellite, train, car, truck, equipment pack, and/or any other device or structure configured to move. As a further example, the one or more antennas 108 can be configured to rotate about an axis, move in a linear direction, and/or the like. The one or more antennas 108 can be configured for communication of information, detection of information, and/or the like. For example, the one or more antennas 108 can be configured as a radio detection and ranging (RADAR) device, light detection and ranging (LIDAR) device, and/or the like.

In an aspect, the one or more antennas 108 can be configured to transmit and/or receive signals, such as electromagnetic signals (e.g., radio waves, light). For example, at least a portion of the one or more antennas can transmit a first signal 110 and/or receive a first return signal 112. For example, the first return signal 112 can be based on reflection (e.g., from an object, particle) occurring within a first distance 114 from the one or more antennas 108. At least a portion of the one or more antennas 108 can transmit a second signal 116 and/or receive a second return signal 118. For example, the second return signal 118 can be based on reflection (e.g., from an object, particle) occurring within a second distance 120 from the one or more antennas 108. At least a portion of the one or more antennas 108 can transmit a third signal 122 and/or receive a third return signal 124. For example, the third return signal 124 can be based on reflection (e.g., from an object, particle) occurring within a third distance 126 from the one or more antennas 108.

It should be noted that the first signal 110, second signal 116, and/or third signal 122 can reflect at any of the first distance 114, second distance 120, and third distance 126 resulting in corresponding returned signals. For example, at least a portion of the two or more antennas 108 can transmit the first signal 110 and/or receive one or more of the first return signal 112, second return signal 118, and third return signal 124 from one or more of the first distance 114, second distance 120, and third distance 126 due to reflections (e.g. objects, particles) residing at these respective distances which constitutes an initial set of received signals. At least a portion of the two or more antennas 108 can transmit a second signal 116 and/or receive one or more of the first return signal 112, second return signal 118, and third return signal 124 from one or more of the first distance 114, second distance 120, and third distance 126 due to reflections (e.g. objects, particles) residing at these respective distances which constitutes a second set of received signals. At least a portion of the two or more antennas 108 can transmit a third signal 122 and/or receive one or more of the first return signal 112, second return signal 118, and third return signal 124 from one or more of the first distance 114, second distance 120, and third distance 126 due to reflections (e.g. objects, particles) residing at these respective distances which constitutes a third set of received signals.

In one aspect, the first distance 114, second distance 120, and third distance 126 can be a vertical distance (e.g., above or below the antennas), horizontal distance, and/or the like. For example, the first signal 110, second signal 116, and/or third signal 122 can be transmitted into one or more layers of the atmosphere (e.g., ionosphere, exosphere, thermosphere, mesosphere, stratosphere, troposphere), through a body of water, across land, into outer space, and/or the like. Additionally, it should be understood that the first return signal 112, second return signal 118, and/or third return signal 124 can be received from the same antenna that transmitted the first signal 110, second signal 16, and/or third signal 122 or a different antenna of the one or more antennas 108. In another aspect, the first signal 110, second signal 116, and third signals 122 can transmitted from the one or more antennas 108 at the same time or at different times. The first return signal 112 can be received at a first time. The second return signal 118 can be received at a second time. The third return signal 124 can be received at third time. In one aspect, the first time can occur before the second time, and the second time can occur before the third time.

In an aspect, the system 100 can comprise a first device 104 configured to manage the one or more antennas 108. The first device 104 can be communicatively coupled with the one or more antennas 108 through a network link, direct link, bus, and/or the like. The first device 104 can be configured to control transmission of signals from the one or more antennas 108. The first device 104 can be configured to receive, process, analyze, store, and/or the like signals received by the one or more antennas 108. For example, the first device 104 can comprise analog-to-digital converters, digital-to-analog converters, signal processing hardware, signal processing software, and/or the like. For example, the first device 104 can convert the signals to information, such as digital information. The first device 104 can comprise temporary and/or permanent storage to store the digital information.

The first device 104 can comprise a server for communicating with the second device 106. The first device 104 can communicate with the second device 106 for providing data and/or services. For example, the first device 104 can be configured to provide the information to the second device 106. The first device 104 can be configured to allow the second device 106 to control the one or more antennas 108. The first device 104 can receive instructions and information from the second device 106 and convert the instructions and/or information into one or more analog signals for transmission from the one or more antennas 108. In an aspect, the first device 104 can be disposed at a location proximate to the one or more antennas 108.

In an aspect, the system 100 can comprise a second device 106. The second device 106 can be a user device. The second device 106 can be configured to provide content, services, information, applications, and/or the like to one or more users. For example, the second device 106 can comprise a computer, a smart device (e.g., smart phone, smart watch, smart glasses, smart apparel, smart accessory), a laptop, a tablet, a display device (e.g., television, monitor), digital streaming device, proxy, gateway, transportation device (e.g., on board computer, navigation system), and/or the like.

In one aspect, the second device 106 can comprise a storage unit 128 configured to store information, such as signal information (e.g., digital information corresponding to a transmitted and/or received signal). For example, the storage unit 128 can be configured to store information related to the first signal 110, second signal 116, third signal 122, first return signal 112, second return signal 118, third return signal 124, and/or the like. For example, the second device 106 can request and/or receive the information from the first device 104.

In one aspect, the second device 106 can comprise a correction unit 130 configured to process (e.g., analyze, modify) the information. In an aspect the correction unit 130 can be configured process information stored in the storage unit 128. In an aspect, the correction unit 130 can be configured to process information in real-time (e.g., as it arrives from the one or more antennas 108 and first device 104). In one aspect, the correction unit 130 can be configured to determine one or more correction factors. The one or more correction factors can be configured to correct for environmental distortion. The environmental distortion can vary over time and space. For example, the first return signal 112 can be distorted based on first environmental distortion within the first distance 114. The second return signal 118 can be distorted based on second environmental distortion within the second distance 120. The third return signal 124 can be distorted based on third environmental distortion within the third distance 126.

In an aspect, the one or more correction factors can comprise a correction factor for each of the one or more antennas 108 for a particular sample time. The sample time can correspond to a particular range gate, which is a particular distance from the one or more antennas 108. For example, the first distance 114 can be a first range gate, the second distance 120 can be a second range gate, and the third distance 126 can be a third range gate. In an aspect, each of the one or more antennas 108 can receive (e.g., sample) the first return signal 112 at the first time. The correction unit 130 can determine a correction factor for each (or at least a portion) of the one or more antennas 108. In one aspect, for N number of antennas, N correction factors can be determined for a given sample time. As another example, for N number of antennas, N−1 (e.g., or other appropriate number) of correction factors can be determined for a given sample time.

In an aspect, the correction unit 130 can determine the one or more correction factors by comparing signal information of a first portion of the one or more antennas 108 to signal information sampled at a second portion of the one or more antennas 103. For example, signal information sampled at each antenna of the one or more antennas 108 can comprise phase information, amplitude information, and/or the like corresponding to a particular antenna sampled at a particular time. The environmental distortion can cause variations in phase information of received signals from one antenna to another antenna sampling the return signals (e.g., first return signal 112, second return signal 118, third return signal 124) at the same time. The environmental distortion can cause variations in amplitude information of received signals from one antenna to another antenna sampling the return signals at the same time. For example, the correction unit 130 can select a reference phase, such as a phase of a signal sampled from an antenna of the one or more antennas 108. The correction unit 130 can select a reference amplitude, such as the amplitude of an ideal plane wave that yields an equal amount of energy across the one or more antennas 108. The reference phase, reference amplitude, and/or the like can be a reference for a particular time sampling (e.g., associated with a particular range gate or distance). The phase of a complex correction factor for a particular antenna can be determined by calculating a difference between the reference phase and the phase (e.g., as indicated in the phase information) of the signal sampled by the antenna. The amplitude of a complex correction factor for a particular antenna can be determined by calculating a ratio between a reference amplitude and the amplitude (e.g., as indicated in the amplitude information) of the signal sampled by the antenna. For example, the complex correction factor can be configured to correct the signal information associated with a particular antenna for a particular sampling time. For example, a complex correction factor can be of the form:

$$h = Ae^{j\gamma}$$

where A is the amplitude and $\gamma$ is the phase of the correction factor.

In an aspect, the correction unit 130 can be configured to determine the correction factors based on one or more previous correction factors. For example, a first correction factor for the first return signal 112 received at the first time at a first antenna of the one or more antennas 108 can be determined based on a prior correction factor for a prior signal received at the first antenna. For example, the prior signal can be received at the first antenna at a time before the first time. As another example, the first correction factor can be determined based on a plurality of prior correction factors determined for the first antenna. The prior signal and/or plurality of prior signals can be used to estimate, predict, and/or the like an appropriate correction factor for the first antenna. For example, the correction factors can be estimated based on a feedback loop, predictive (lattice) filtering, and/or the like.

As an illustration, correction factors can be determined by the following equation:

$$h(k) = B(k)e^{j\gamma(k)} = \left(\frac{1}{c_0}\sum_{n=1}^{N} c_n B(k-n)\right) e^{j\left(\frac{1}{d_0}\sum_{n=1}^{N} d_n \gamma(k-n)\right)}$$

Both the phase $\gamma(k)$ and amplitude $B(k)$ can be expressed as weighted summations of prior phase and amplitude correction values respectively. The weights, $c_n$ and $d_n$, specify the filter responses. It is contemplated that Many types of filters may be designed and may produce accurate results for predicting correction factors.

The correction unit 130 can be configured to correct and/or otherwise modify the signal information based on the one or more correction factors. For example, the correction unit 130 can be configured to apply the correction factors to signal information. For example, the correction unit 130 can multiply, add, divide, subtract, and/or the like the correction factors to the signal information. For example, a first correction factor can be multiplied, added, divided, subtracted, and/or the like to signal information from (e.g., associated with, related to, originating from) the first return signal 112. A second correction factor can be multiplied, added, divided, subtracted, and/or the like to signal information from (e.g., associated with, related to, originating from) the second return signal 118. A third correction factor can be multiplied, added, divided, subtracted, and/or the like to signal information from (e.g., associated with, related to, originating from) the third return signal 124.

As an illustration, the received signal from a single transmit pulse, from a single range gate at one antenna can be represented using a single complex number defined as:

$$y=Ae^{j\theta}$$

In general, a complex correction factor can be defined as follows:

$$h=Be^{j\gamma}$$

The signal, y, can be corrected by forming the product:

$$y=yh=(Ae^{j\theta})(Be^{j\gamma})=ABe^{j(\theta+\gamma)}.$$

The correction can both phase align y with the (N−1) other complex numbers (received by the (N−1) other antennas) at this range gate from this transmit pulse and also scale y so that the wavefront across the aperture appears as an ideal plane wave. The correction factor for each antenna and range gate can be updated between transmit pulses as described herein.

In one aspect, the second device 106 can comprise an interface unit 132 configured to provide an interface to a user to interact with the second device 106 and/or remote devices, such as the first device 104. The interface unit 132 can be any interface for presenting and/or receiving information to/from the user, such as user feedback. An example interface can comprise a content viewer, such as a web browser (e.g., Internet Explorers®, Mozilla Firefox®, Google Chrome®, Safari®, or the like), media player, application (e.g., web application, mobile application), and/or the like. Other software, hardware, and/or interfaces can be used to provide communication between the user and one or more of the second device 106 and the first device 104.

In an aspect, the second device 106 can comprise a communication unit 134. As an example, the communication unit 134 can request or query various files from a local source and/or a remote source. As a further example, the communication unit 134 can transmit and/or receive data to a local or remote device such as the first device 104. The communication unit 134 can comprise hardware and/or software to facilitate communication. For example, the communication unit 134 can comprise one or more of a modem, transceiver (e.g., wireless transceiver)), digital-to-analog converter, analog-to-digital converter, encoder, decoder, modulator, demodulator, tuner (e.g., QAM tuner, QPSK tuner), and/or the like. In one aspect, the communication unit 134 can be configured to allow one or more remote devices (e.g., in a local or remote portion of the network 102) to control operation of the second device 106.

It should be understood that some or all the aspects of the second device 106 can be implemented on the first device 104. For example, the correction unit 130, storage unit 128, interface unit 143, and/or the like can be implemented on the first device 104. For example, the first device 104 can comprise a database, signal processing hardware, signal processing software, and/or the like configured to implement one or more aspects associated with the second device 106.

Figure 2:
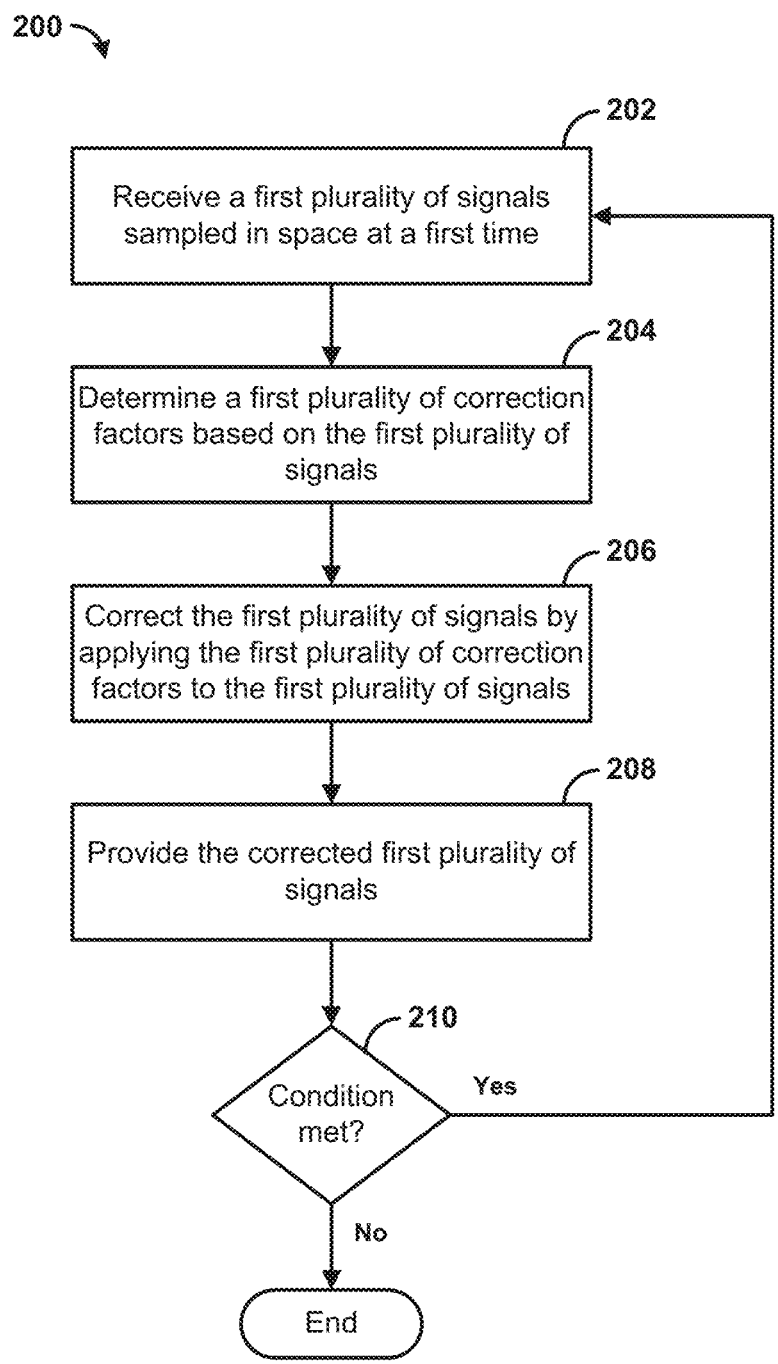
FIG. 2 is a flowchart illustrating an example method for correcting signals.

FIG. 2 is a flowchart illustrating an example method 200 for correcting signals. In an aspect, a signal can be transmitted, such as a radio signal pulse. For example, the signal can be transmitted from one or more antennas, such as a phased antenna array. For example, the one or more antennas can comprise at least two antennas. At step 202, a first plurality of signals sampled in space at a first time can be received. For example, the first plurality of signals can be reflections of the radio signal pulse sampled in space and time. In an aspect, the first plurality of signals can be received collectively by at least a portion of the one or more antennas. For example, the first plurality of signals can be received by the phased antenna array.

At step 204, a first plurality of correction factors can be determined based on the first plurality of signals. The first plurality of correction factors can be configured to correct environmental distortion in the first plurality of signals. In an aspect, the first plurality of correction factors can be configured to correct for variations in the environmental distortion among the first plurality of signals. The first plurality of correction factors can be configured to align sets within the first plurality of signals to a set of reference phases and scale sets within the first plurality of signals to a set of reference amplitudes. For example, the first plurality of correction factors can be selected to correct for differences in phase and amplitude among (e.g., specific sets in) the first plurality of signals.

At step 206, the first plurality of signals can be corrected by applying the first plurality of correction factors to the first plurality of signals thereby generating a corrected first plurality of signals. Applying the first plurality of correction factors can comprise correcting the environmental distortion in the first plurality of signals. For example, each of the first plurality of correction factors can be applied (e.g., added, multiplied, divided, subtracted, or the like) to corresponding signals (e.g., or data representative of the signals) of the first plurality of signals.

At step 208, the corrected first plurality of signals can be provided. For example, the corrected first plurality of signals can be provided to local storage, a remote device, additional hardware and/or software elements for further processing, and/or the like.

At step 210, it can be determined whether a condition is met. For example, the condition can be a predefined time range, receiving a command from a user, not receiving a command from a user, and/or the like. If the condition is met, the method 200 can return to step 202. Otherwise, the method 200 can end. For example, one or more of steps 202-210 can be repeated for one or more additional pluralities of signals sampled at times subsequent to the first time with corresponding additional pluralities of correction factors. Each additional plurality of correction factors can be unique to a corresponding plurality of signals of the one or more additional plurality of signals. For example, the additional pluralities of signals can be reflections of the radio signal pulse sampled in space and time. In an aspect, the one or more additional plurality of signals can be received collectively by one or more antennas, such as a phased antenna array.

The environmental distortion in the first plurality of received signals can be different from the environmental distortion in each of the one or more additional pluralities of signals. Each of the additional plurality of correction factors can be determined by estimating each of the additional plurality of correction factors based on one or more pluralities of correction factors determined at a time prior to the additional plurality of correction factors being estimated.

Figure 3:
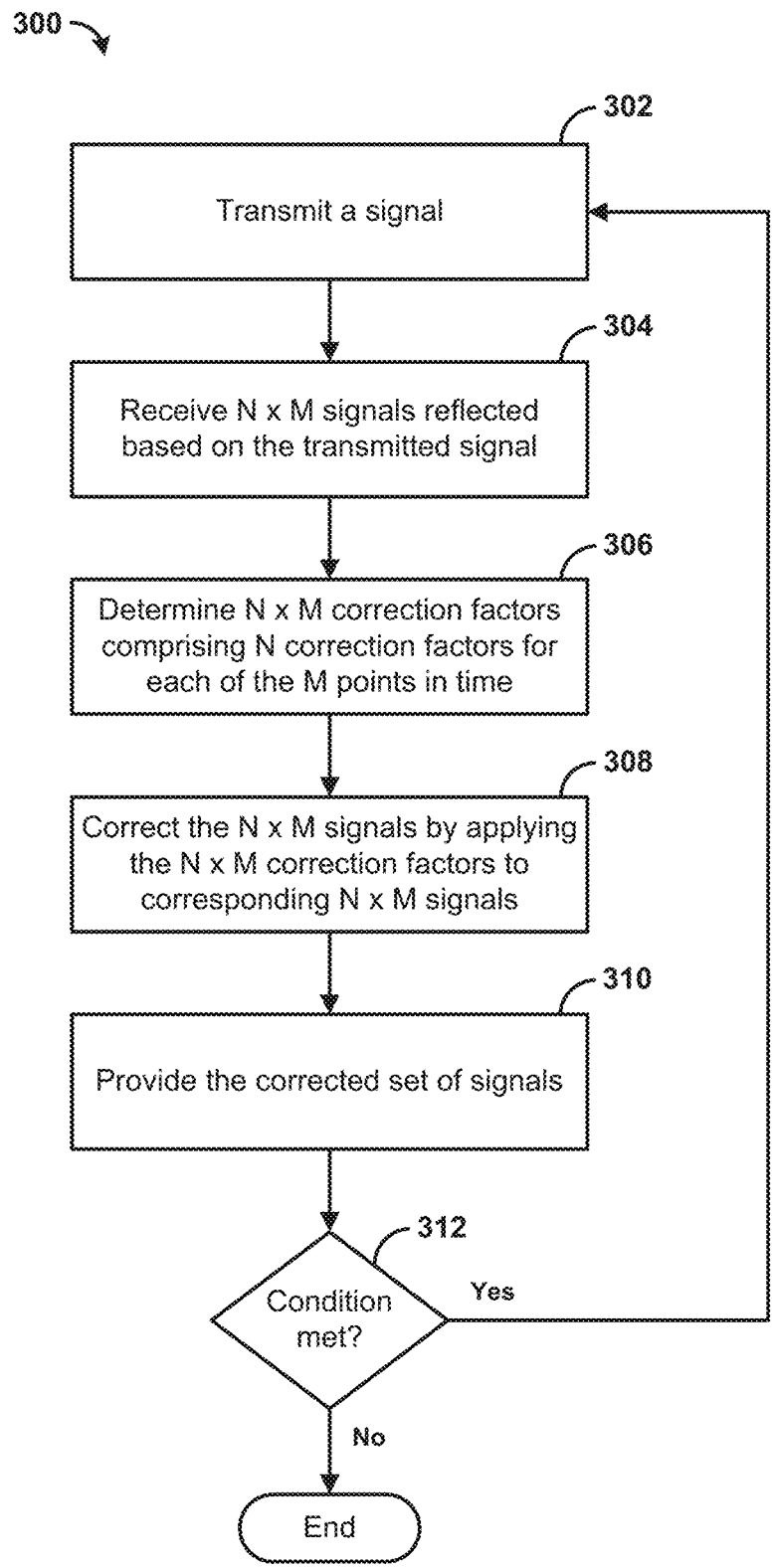
FIG. 3 is a flowchart illustrating another example method for correcting signals.

FIG. 3 is a flowchart illustrating another example method 300 for correcting signals. At step 302, a signal can be transmitted. The transmitted signal can comprise a RADAR signal. The N×M reflected signals can be RADAR echoes sampled at the N points in space and the M points in time. For example, the signal can be transmitted from one or more antennas (e.g., at least two antennas). The one or more antennas can comprise N spatially separated antennas. In an aspect, the one or more antennas can be a phased antenna array.

At step 304, N×M signals reflected based on the transmitted signal can be received. The N×M signals can be received at N points in space and M points in time. Each M point in time can correspond to a reflection of the signal (e.g., transmitted at step 302) from a different volume of space. The N×M signals can be one or more reflections of the transmitted radio signal from one or more different volumes of space at the N spatially separated antennas.

At step 306, N×M correction factors comprising N correction factors for each of the M points in time can be determined. The N×M correction factors can be configured to correct for time-varying environmental distortion. The time-varying environmental distortion can be specific to each of the M volumes of space and produce phase and amplitude variations between each of the N points in space. For example, the time-varying environmental distortion can cause variations, fluctuations, and/or the like (e.g., in phase, amplitude) among N signals (e.g., at N points in space) received at a particular M point in time. The time-varying environmental distortion can cause variations, fluctuations, and/or the like (e.g., in phase, amplitude) among signals (e.g., at one points in space) received at different points in time.

In one aspect, the time-varying environmental distortion can occur before the corresponding N×M signals are received. In another aspect, the time-varying environmental distortion can occur after the signal is transmitted. For example, the time-varying environmental distortion can occur while the transmitted signals traverses a volume (e.g., atmospheric volume) between the one or more antennas and various points where the transmitted signal is reflected back to the one or more antennas.

The N×M correction factors can be configured to align the phases of M sets of N signals to M unique reference phases, scale the amplitudes of M sets of N signals to M unique amplitudes, and/or the like. For example, the N×M correction factors can comprise N complex correction factors for each of the corresponding M points in time. The N complex correction factors can be selected to correct for phase differences between the signals received at the N points in space (e.g., for a corresponding M point in time). As a further explanation, the N×M correction factors can be selected to correct for M different received signals corresponding to M reflections of a transmit pulse (e.g., the transmitted signal for step 302) from M unique volumes of space.

In an aspect, at least a portion of the N×M correction factors can be estimated based on correction factors used at prior times (e.g., prior to any of the M points in time, or prior points in time among the M points in time). For example, one or more (or each) of the N×M correction factors during the K+1 iteration can be estimated based on the corresponding correction factors in the N×M sets from prior iterations K, K−1, K−2, and/or the like. For example, a feedback loop can be used to iteratively update the N×M correction factors. As another example, predictive (lattice) filtering can be used to estimate, update, and/or otherwise calculate one or more of the N×M correction factors.

At step 308, the N×M signals can be corrected by applying the N×M correction factors to corresponding signals of the N×M signals thereby generating a corrected set of signals. For example, each of the N×M correction factors can be applied (e.g., added, multiplied, divided, subtracted, or the like) to corresponding signals (e.g., or data representative of the signals) of the N×M signals.

At step 310, the corrected set of signals can be provided. For example, the corrected set of signals can be provided to local storage, a remote device, additional hardware and/or software elements for further processing, and/or the like.

At step 312, it can be determined whether a condition is met. For example, the condition can be a predefined time range, receiving a command from a user, not receiving a command from a user, and/or the like. If the condition is met, the method 300 can return to step 302. Otherwise, the method 300 can end. For example, one or more of steps 302-312 can be repeated thereby updating the N×M correction factors for each iteration based on N×M signals received during the iteration and one or more sets of N×M signals received prior to the corresponding iteration to adaptively compensate for time-varying environmental distortion of each iteration. For example, an iteration can occur for every a single transmit pulse. For each iteration, each of N antennas can take M samples after every transmit pulse, resulting in N×M signals per iteration.

Aspects of the disclosure are described in greater detail through the following examples. The following examples are put forth so as to provide those of ordinary skill in the art with a complete disclosure and description of how the articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

Figure 4A:
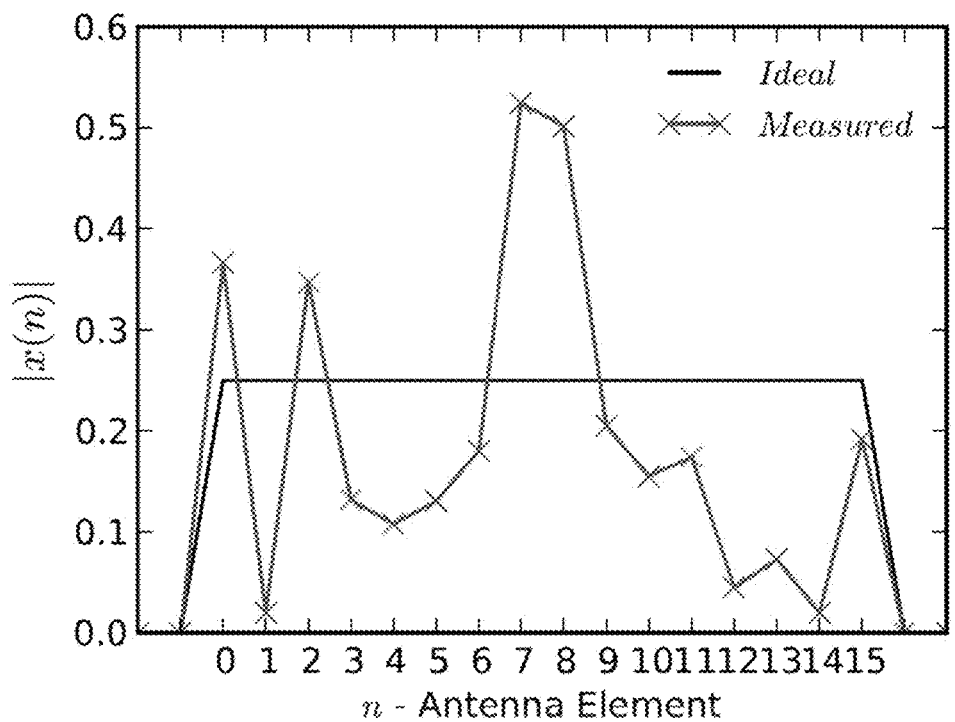
FIG. 4A illustrates scintillation by comparing the magnitude of an ideal and measured wavefront across the antenna array.
Figure 4B:
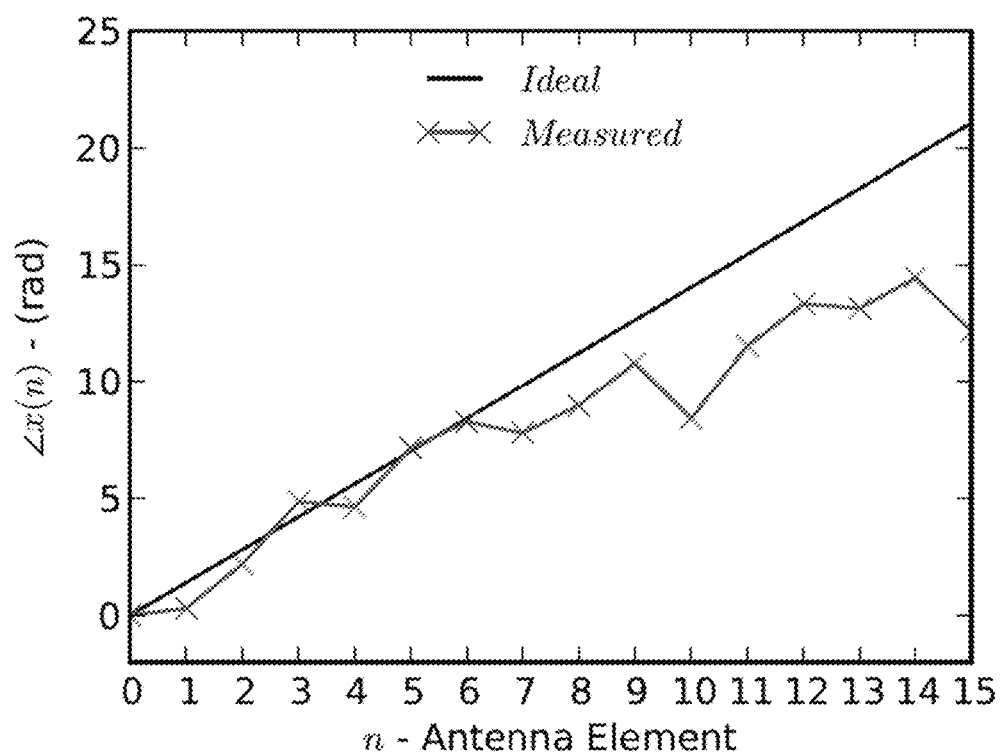
FIG. 4B illustrates scintillation by comparing the phase of an ideal and measured wavefront across the antenna array.
Figure 4C:
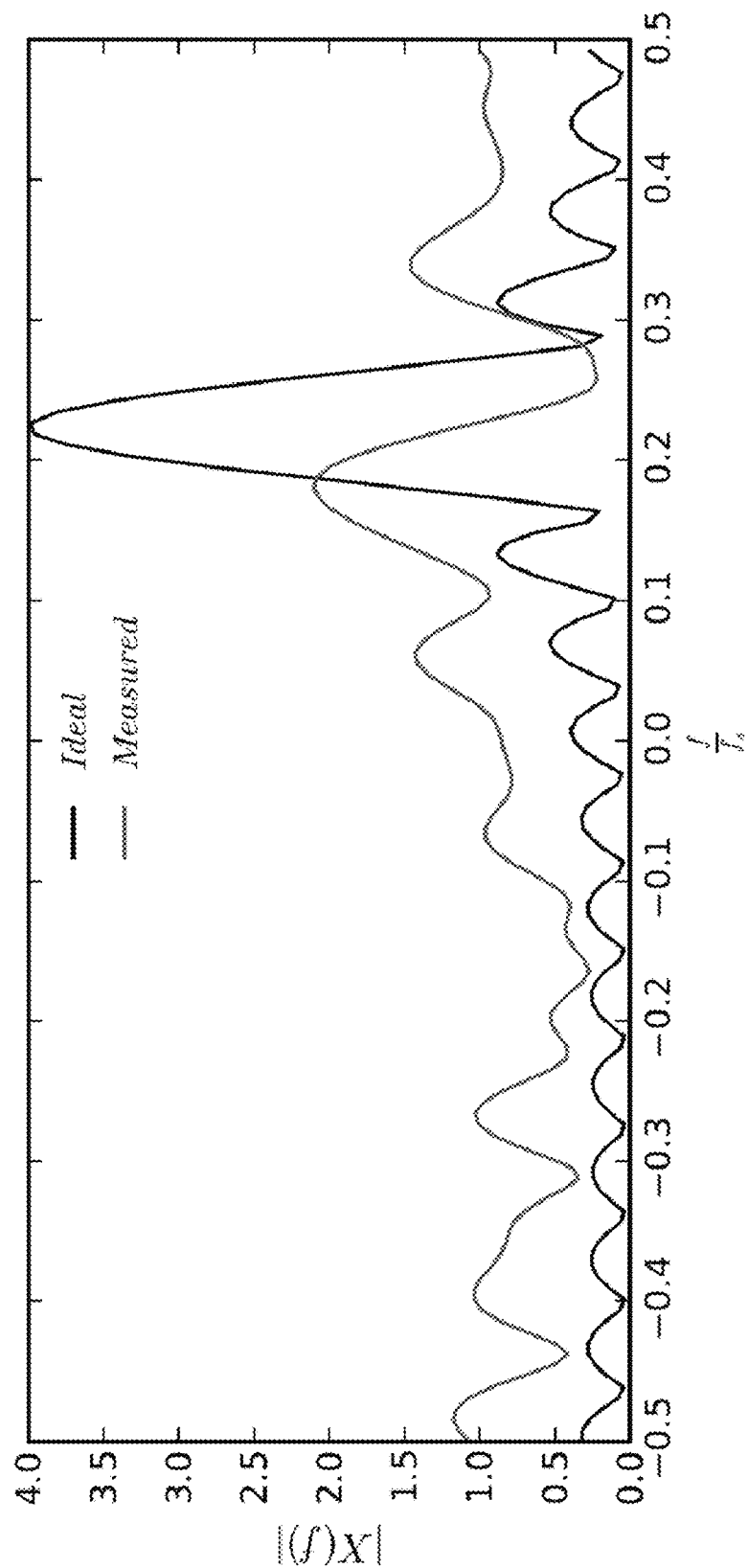
FIG. 4C illustrates scintillation by comparing the angular spectrum of an ideal and measured wavefront across the antenna array.

The field of adaptive optics (AO) was originally developed to mitigate atmospheric turbulence induced optical distortion viewed by ground based telescopes. However, AO methods have since been applied to imaging in other fields such as ultrasonic, retinal, and radio which face the same fundamental problem of correcting phase aberrations in the imaging system. In any imaging system, phase aberrations in the incident wavefront can hamper the ability of the receive aperture to coherently combine the incoming signal or alternatively to angularly resolve the source of the signal. Here the application of an AO algorithm to improving the performance of the Super Dual Auroral Radar Network (SuperDARN) phased array system is investigated. Diffraction and scattering during propagation through the ionosphere results in wavefronts incident on the radar whose amplitude and phase may fluctuate over the physical extent of the array. An example of this scintillation is demonstrated in FIG. 4A, FIG. 4B, and FIG. 4C, which compare the magnitude, phase, and angular spectrum of ideal and measured normalized wavefronts from a meteor echo across the 16 element array. FIG. 4A illustrates scintillation by comparing the magnitude of an ideal and measured wavefront across the antenna array. FIG. 4B illustrates scintillation by comparing the phase of an ideal and measured wavefront across the antenna array. FIG. 4C illustrates scintillation by comparing the angular spectrum of an ideal and measured wavefront across the antenna array. The angular spectrum in FIG. 4C is the N=128 point zero-padded Fast-Fourier Transform (FFT) of the complex data in FIG. 4A and FIG. 4B plotted as a function of normalized spatial frequency. It should be noted that the effect of fluctuations in the measured amplitude and phase across the array in FIG. 4A and FIG. 4B is spreading in the angular spectrum in FIG. 4C as compared to the ideal case. While the peak of the ideal angular spectrum occurs in the beam direction and is equal to the area of the spatial waveform, $A_{ideal}$=4.0, spreading in the spectrum of the scintillated wavefront reduces the peak value to ~2.0=$A_{ideal}$/2.

The scintillation evident in FIG. 4A, FIG. 4B, and FIG. 4C is a product of the inhomogeneity of the ionosphere as HF waves can undergo diffraction and scattering during propagation. These physical effects impose a limit on the length, $l_{coh}$, time, $T_{coh}$, and the bandwidth, $f_{coh}$, over which a propagating signal is correlated. For the ionosphere, analytical expressions have been derived and numerical simulations have been performed to evaluate these coherence lengths, which in general a function of the ionospheric irregularities, wavelength, and propagation distance. Finite $l_{coh}$, $T_{coh}$, and $f_{coh}$ may negatively impact radar performance through a number of mechanisms. In an aspect, the present methods and systems can be relevant to the case where $l_{coh}$ is on the order of the array length and $T_{coh}$ is less than a coherent processing interval (CPI). In this situation, the phase of the wavefront across the array can be distorted and time-varying over the observation period. In addition, as the distortion of the wavefront is a function of the propagation path, each range gate sampled can be uniquely distorted. Absent application of a corrective algorithm on a per range gate basis, conventional beamforming may not yield any gain in signal to noise ratio (SNR) as the phase of the incident wavefront across the aperture may not be a linear function. Directly corresponding to a reduction in SNR is a loss of angular resolution in the azimuth dimension. However, provided that the scintillation across the array is slowly varying, an AO algorithm can effectively correct and track the distorted wavefront at each range gate to approximate the radar performance under scintillation free conditions.

In this disclosure, the model of the received signal from a point target at the radar in the ideal case and in the case where scintillation produces a random phase profile across the array is described. The reduction in radar performance in terms of angular resolution and achievable array gain in the case of a random phase profile is quantified and compared to the performance in the ideal case. In an aspect, the radar performance in the ideal case can provide an upper bound on the performance of an AO correction algorithm. The implementation of an AO algorithm which can compensate for slowly varying scintillation effects is disclosed. In the present disclosure, the AO algorithm presented is applied to data recorded by the Kodiak SuperDARN and improvement over the existing operation is demonstrated.

In the following paragraphs, a model of the received signal from a point target in the ideal and scintillated cases is disclosed. In all cases, the normalized transmitted signal may be expressed as, $$s(t) = \sqrt{\frac{2}{E_g}} g(t)\cos(2\pi f_c t) \quad (1)$$

where g(t) is the baseband waveform with energy $E_g$.

An ideal homogeneous medium is described as follows. Point targets in homogeneous mediums can be modeled as a linear, time-invariant (LTI) system with an impulse response so that the received signal is a scaled, delayed, and possibly frequency shifted version of (1):

$$r(t) = Ks(t-\tau) \quad (2)$$

-continued
$$= Kg(t-\tau)\cos(2\pi(f_c+f_d)(t-\tau))$$
$$= Kg(t-\tau)\cos(2\pi(f_c+f_d)(t+\emptyset))$$

which has a complex lowpass representation of:

$$x(t)=Ke^{j\varphi}e^{jf_d t}g(t-\tau) \quad (3)$$

Given a one-dimensional linear array comprising N elements, the lowpass waveform at the $n^{th}$ element of the array is related to the waveform at a reference element by:

$$x_n(t)=e^{jn\gamma}x(t) \quad (4)$$

where the phase factor $\gamma$ is a function of incidence angle $\alpha$, wavelength $\lambda$, and separation d between elements given by:

$$\gamma = \frac{2\pi d \sin(\alpha)}{\lambda} \quad (5)$$

The effect of propagation through an inhomogeneous medium is modeled as the addition of a random phase profile across the radar aperture. Specifically, it is assumed that the form of the lowpass received waveform at a given antenna element is the same as in (3) but that the phase shift between elements is no longer given by the linear relationship in (4). Instead, the phase relationship across the array can be modeled as a slowly-varying random process so that the lowpass signal at the $n^{th}$ element in the array is related to that at a reference element by:

$$x_n(t)=e^{j\theta(n)}x(t) \quad (6)$$

where the random variable (RV) θ(n) is a sample function of what is assumed to be a stationary random process.

The random phase ripple in the incident wavefront indicated by (6) can hamper the ability of the radar to angularly resolve a target in azimuth. Further, the random phase ripple can reduce the array gain achieved which depends on the coherent summation of the wavefront across the aperture. In the following paragraphs the reduction in azimuth resolution will be quantified by evaluating and comparing the Cramer Rao Lower Bound (CRLB) for the ideal case and for a model of the random phase perturbations. In addition, achievable array gain is evaluated for a model of the scintillation and compared to the ideal case.

Azimuth resolution is described as follows. Note that a wavefront incident at an angle $\alpha$ with respect to broadside produces a spatial frequency across the radar aperture given by, $$\omega_s = \frac{\gamma}{d} = \frac{2\pi \sin \alpha}{\lambda} \quad (7)$$

The minimum variance in estimating $\omega_s$ given a vector of observation RV's $\hat{y}=y_0, \ldots, y_N$ dependent on $\omega_s$ is the CRLB given by, $$\sigma^2_{\omega_s} = \frac{1}{-E\left[\frac{\partial \ln\{p(\hat{y}|\omega_s)\}}{\partial \omega_s^2}\right]} \quad (8)$$

In the ideal case of a plane wave front across a linear array of N elements, each RV $y_n$ has the form, $$y_n = Ae^{j(\omega_s x_n + \varphi)} + w_n; \quad n = 0, \ldots, N-1 \quad (9)$$

where the $x_n$'s are spaced by $$\Delta x = \frac{L}{N}.$$

The quadrature components of (9) are, $$y_n = (y_{ni} + w_{ni}) + j(y_{nq} + w_{nq})$$

$$y_{ni} = A\cos(\omega_s x_n + \varphi) + w_{ni}$$

$$y_{nq} = A\sin(\omega_s x_n + \varphi) + w_{nq} \quad (10)$$

where $w_{ni}$, $w_{nq}$ are the quadrature receiver thermal noise components each of variance $\sigma_w^2$. The joint probability density function of the in-phase signal component conditioned on the spatial frequency $\omega_s$ is given by, $$p(\hat{y} \mid \omega_s) = \prod_{n=0}^{N-1} \frac{1}{\sqrt{2\pi\sigma_w^2}} e^{-\frac{(y_{ni} - A\cos(\omega_s x_n + \varphi))^2}{2\sigma_w^2}} \quad (11)$$

$$p(\hat{y} \mid \omega_s) = \frac{1}{\sqrt{2\pi\sigma_w^2}} e^{\sum_{n=0}^{N-1} \frac{-(y_{ni} - A\cos(\omega_s x_n + \varphi))^2}{2\sigma_w^2}}$$

From (11), the denominator of the CRLB can be reduced to:

$$-E\left[\frac{\partial \ln\{p(\hat{y} \mid \omega_s)\}}{\partial \omega_s^2}\right] = \frac{A}{2\sigma_w^2}\left[\sum_{n=0}^{N-1} x_n^2 - \sum_{n=0}^{N-1} x_n^2 \cos(2\omega_s x_n + 2\varphi)\right] \quad (12)$$

Assuming the summation over the double frequency component is small relative to the first term on the RHS of (12) and recognizing $$\frac{A}{2\sigma_w^2}$$

as the single antenna element SNR, (12) further simplifies to:

$$-E\left[\frac{\partial \ln\{p(\hat{y} \mid \omega_s)\}}{\partial \omega_s^2}\right] = SNR \cdot \sum_{n=0}^{N-1} x_n^2 = SNR \cdot \quad (13)$$

$$\sum_{n=0}^{N-1}\left(\left(n - \frac{N}{2}\right)\Delta x\right)^2 = SNR \cdot \sum_{n=0}^{N-1}\left(\left(n - \frac{N}{2}\right)\left(\frac{L}{N}\right)\right)^2 \cong SNR \cdot \frac{NL^2}{12}$$

so that the variance in estimating spatial frequency is bounded by, $$\sigma_{\omega_s}^2 \geq \frac{12}{N \cdot L^2 \cdot SNR} \quad (14)$$

Note from (14) that the CRLB is inversely proportional to SNR, total aperture length, and the number of sample points in the aperture.

The CRLB for a model of scintillation is evaluated as follows. The analytic signal at each point in the aperture is again given by (9) with the exception that the phase $\varphi$ is now a random variable. Assume each $\varphi_n$ is an independent and identically distributed (IID) normal RV with zero mean and variance $\sigma_\varphi^2$. Ignoring the influence of thermal noise, the joint PDF of the in-phase signal component conditioned on $\omega_s$ can be found after several RV transformations as, $$p(\hat{y} \mid \omega_s) = \prod_{n=0}^{N-1} \frac{1}{\sqrt{2\pi\sigma_\varphi^2}} \frac{1}{A\sqrt{1-\left(\frac{y_{ni}}{A}\right)^2}} e^{-\frac{(\cos^{-1}(\frac{y_{ni}}{A}) - \omega_s x_n)^2}{2\sigma_\varphi^2}} \quad (15)$$

$$p(\hat{y} \mid \omega_s) = e^{\sum_{n=0}^{N-1} \frac{-(\cos^{-1}(\frac{y_{ni}}{A}) - \omega_s x_n)^2}{2\sigma_\varphi^2}} \prod_{n=0}^{N-1} \frac{1}{\sqrt{2\pi\sigma_\varphi^2}} \frac{1}{A\sqrt{1-\left(\frac{y_{ni}}{A}\right)^2}}$$

From (15), the denominator of the CRLB reduces to, $$-E\left[\frac{\partial \ln\{p(\hat{y} \mid \omega_s)\}}{\partial \omega_s^2}\right] = \frac{1}{\sigma_\varphi^2} \cdot \sum_{n-1}^{N-1} x_n^2 - E\left[\frac{\partial \ln\{p(\hat{y} \mid \omega_s)\}}{\partial \omega_s^2}\right] \cong \frac{1}{\sigma_\varphi^2} \cdot \frac{NL^2}{12} \quad (16)$$

so that the CRLB in estimating spatial frequency for the modeled scintillation is, $$\sigma_{\omega_s}^2 \geq \frac{12\sigma_\varphi^2}{N \cdot L^2} \quad (17)$$

Similar to the result in (15), the CRLB obtained can be inversely proportional to the aperture size and the number of sample points. However, as a result of the random phase model and the neglect of thermal noise, the CRLB can be independent of signal power and can instead be proportional to the phase perturbation variance. The effect of including thermal noise would be a broadening in the PDF given in (15) and a corresponding increase in uncertainty. The CRLB in this case would also be dependent on SNR. However, in the limiting case of infinite SNR one would arrive at (17).

The ratio of the scintillated CRLB in (17) to the ideal CRLB in (14) is $\sigma_\varphi^2 \cdot SNR$. A target with a SNR can be assumed if 20 dB exists but that scintillation yields random phase perturbations in the wavefront such that $\sigma_\varphi = 20°$. The uncertainty in azimuth can increase by a factor of $\sigma_\varphi^2 \cdot SNR \cong (0.12 \cdot 100) \cong 12$ over the ideal case, clearly demonstrating the need for a correction algorithm.

Ideally, an N element phased array yields an array gain factor of N due to the coherent addition of the desired signal versus the incoherent addition of receiver noise. The coherent summation of the signal across the antenna array results in the instantaneous received power, $$P = (\Sigma_{n=0}^{N-1}(s_n + w_n))^2 \quad (18)$$

where $s_n$ and $w_n$ are the (complex) desired signal and noise at the $n^{th}$ receiver. Assuming thermal noise that is independent between receivers, (18) can reduce to, $$P = \Sigma_{n=0}^{N-1}|s_n|^2 + \Sigma_{n=0}^{N-1}\Sigma_{m=0; m \neq n}^{N-1} s_n s_m^* + N\sigma_w^2 \quad (19)$$

Figure 5:
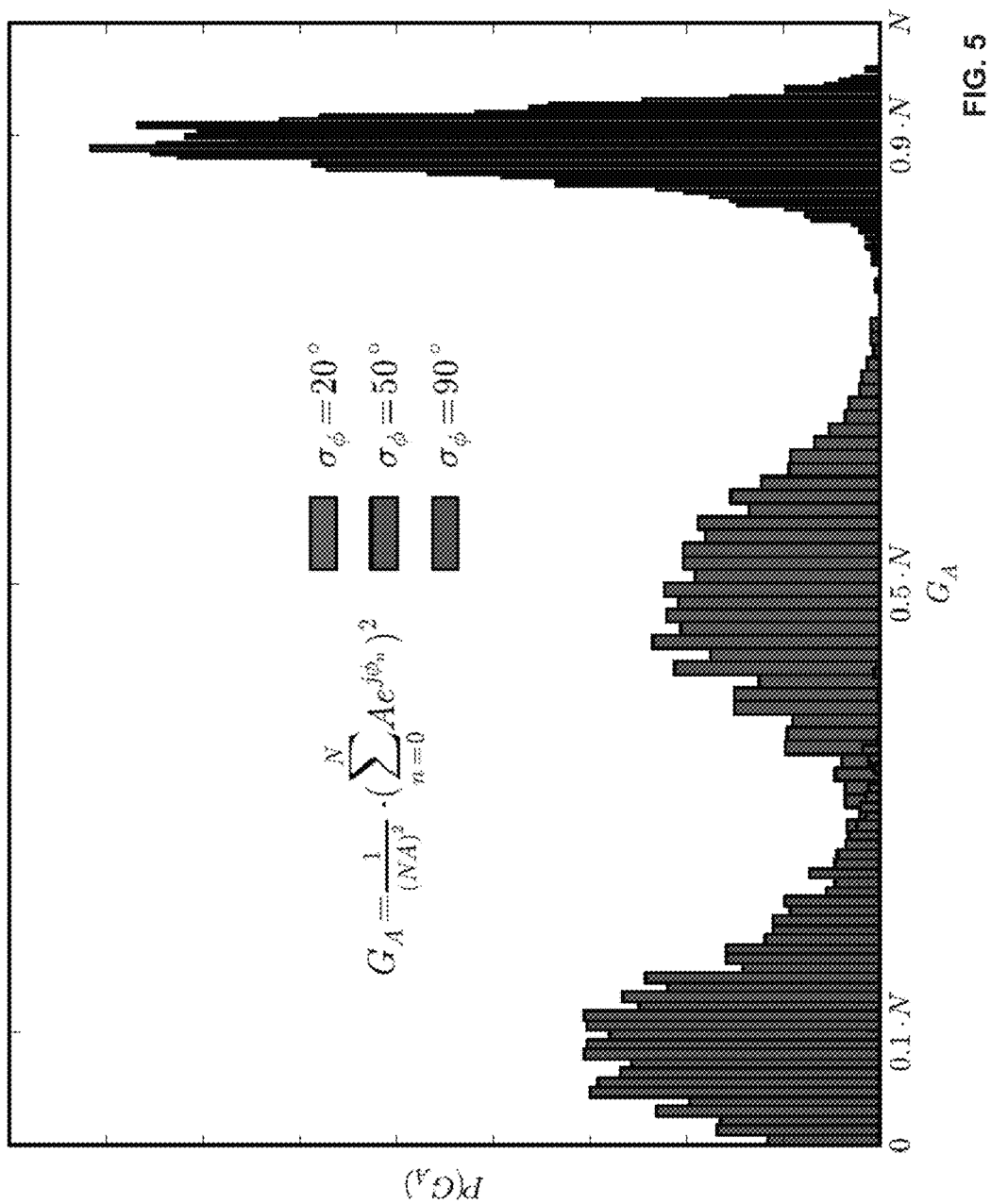
FIG. 5 is a plot illustrating array gain.

In (19), the first and third terms are summations of the signal and noise powers across the array and the second term is the summation of the cross-correlated signal powers $s_n s_m^*$ between array elements. In the ideal case of a planar wavefront, beamforming can yield a constant complex signal across the array such that $s_n=s_m=s$ and the sum of the first two terms in (19) can yield the maximum possible signal power of $N^2 s$. If the incident wavefront is distorted, the complex numbers in the second term of (19) may not be co-phased after beamforming and the summation of the second term may yield a smaller value. The actual array gain achieved can be simply evaluated as, $$G_A = \frac{1}{(NA)^2}\left(\sum_{n=0}^{N-1} A e^{j\varphi_n}\right)^2 \quad (20)$$

given the distributions of the $\varphi_n$'s. FIG. 5 illustrates the empirically evaluated distributions of $G_A$ when the $\varphi_n$'s are ID zero-mean normal RV's of various standard deviations. Based on FIG. 5 and the discussion herein the array gain can be bounded by [N, 0] which demonstrates that the improvement in observed SNR after correcting scintillation can be substantial, particularly when destructive interference yields $G_A<1$ prior to correction.

Besides a reduction in array gain, time variations in the random phase profile can reduce the non-coherent integration gain obtained. Specifically, in the case $\tau_{coh}<T_{CPI}$ the random phase profile and consequently $G_A$ will fluctuate over $T_{CPI}$. This implies that non-fluctuating targets (e.g., Swerling 0) with constant radar cross section (RCS) can appear as fluctuating targets (e.g., Swerling II/IV). Non-coherent integration gain can depend on Swerling target type and can be approximated for a given point on a radar operating curve. Although dependent on the exact point on the ROC, the minimum single sample SNR to achieve a given point on the ROC may typically be obtained for Swerling 0 targets. In the context of this disclosure, the largest target SNR can be obtained if the AO algorithm works ideally to generate non-fluctuating samples across the CPI.

Time, range, and Doppler frequency resolution are described as follows. Time, range, and Doppler frequency resolution can correspond to the ability to discriminate between targets in adjacent time, range, and/or frequency bins. The improvement in SNR discussed can produce a corresponding improvement in these resolutions. Given a non-fluctuating target over the observation period, the well-known CRLB's for these resolutions are:

$$\sigma_{t_0}^2 \geq \frac{1}{SNR\cdot B_{rms}^2} \quad (21)$$

$$\sigma_B^2 \geq \frac{c}{2\sqrt{SNR}\cdot B_{rms}} \quad (22)$$

$$\sigma_{w_d}^2 \geq \frac{1}{SNR\cdot \tau_{rms}^2} \quad (23)$$

where $B_{rms}$ and $T_{rms}$ are the rms bandwidth and time duration of the transmitted signal.

The results prior to this point are based on the assumption of a point target. Most significantly, a plane wave incident on the aperture has been assumed such that the phase across the aperture varies linearly as given in (5). For a point target, any deviation from a linear phase profile may be attributed to the effects of scintillation and phase correction factors and can be calculated to produce an ideal plane wavefront. However, the majority of targets visible in the measured data presented in this disclosure are distributed targets, specifically ground clutter. The amplitude and phase of an echo from a distributed target may vary across the radar aperture due to the interference between different scattering centers within the target. In this case, fluctuations in amplitude and phase across the aperture can no longer be solely attributed to the effects of scintillation which may prevent determining of phase correction factors in the same manner. However, under the operating conditions in which the results of this disclosure were measured, the echo from ground clutter cells should be slowly varying across the dimensions of the radar aperture, in which case the presented AO algorithm can be validly applied.

Figure 6:
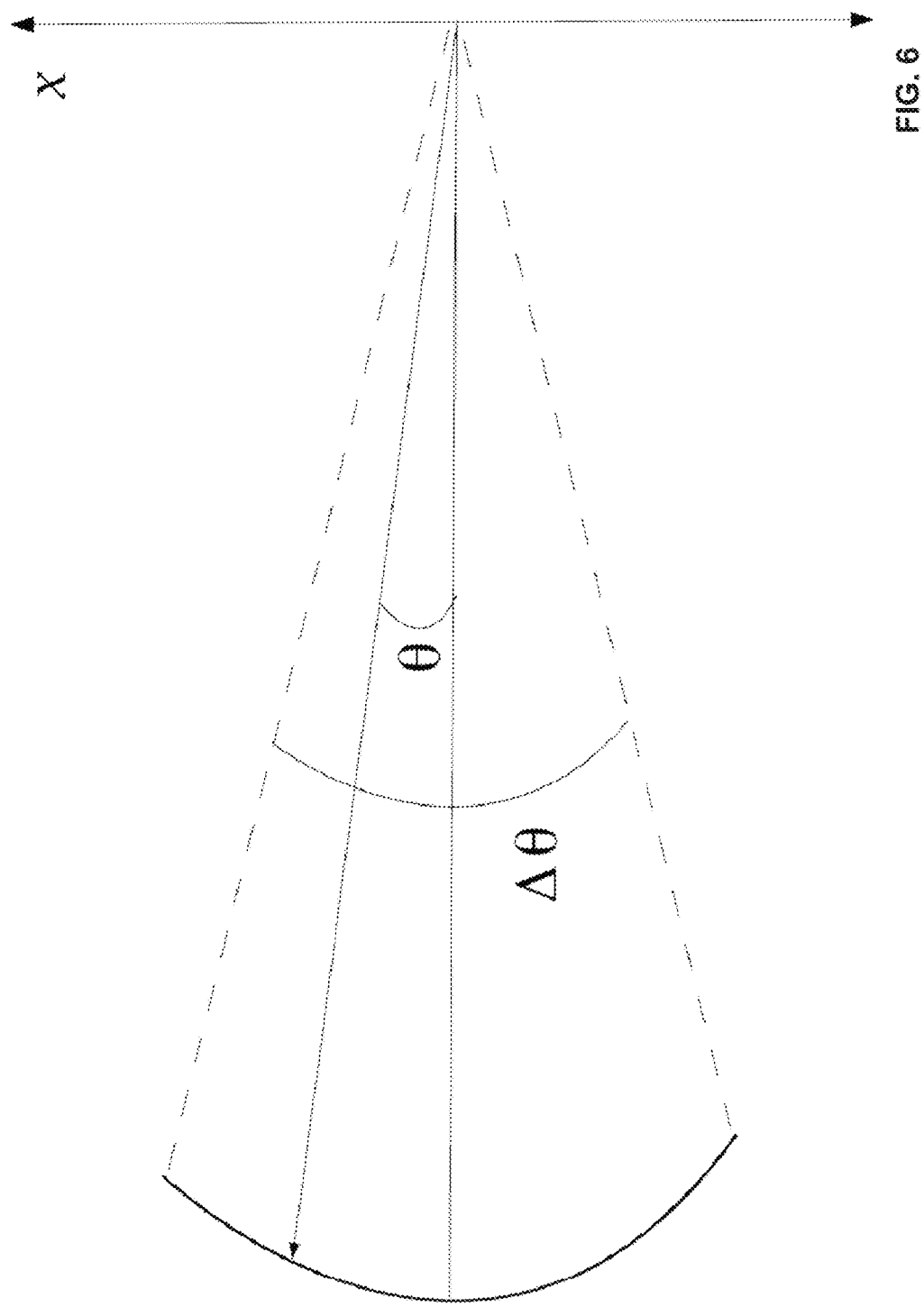
FIG. 6 illustrates a clutter patch comprising a current distribution $J(\theta)$ that illuminates an aperture in the x dimension.

FIG. 6 illustrates a clutter patch comprising a current distribution $J(\theta)$ that illuminates an aperture in the x dimension. Using the far-field assumption and small angle approximation, the field across the aperture can be reduced to a Fourier Transform of the current distribution:

$$e(x)=\int J(u)e^{jkux}du \quad (24)$$

where $u=\sin\theta\cong\theta$. Suppose now that $J(u)$ comprises a large number of independent scatterers distributed across the arc, $$J(u)=\Sigma_n A_n e^{j\varphi_n}\delta(u-u_n) \quad (25)$$

where $A_n e^{j\varphi_n}$ is the complex weight of the $n^{th}$ scatterer and each $u_n$ falls within the illuminated arc. Using (24), the field at point $x_0$ can be expressed as, $$e(x_0)=\Sigma_n A_n e^{j\varphi_n} e^{jku_n x_0} \quad (26)$$

Likewise, the total field at neighboring point $x_0+\Delta$ can be expressed as, $$e(x_0)=\Sigma_n A_n e^{j\varphi_n} e^{jku_n x_0} e^{jku_n \Delta} \quad (27)$$

Figure 7A:
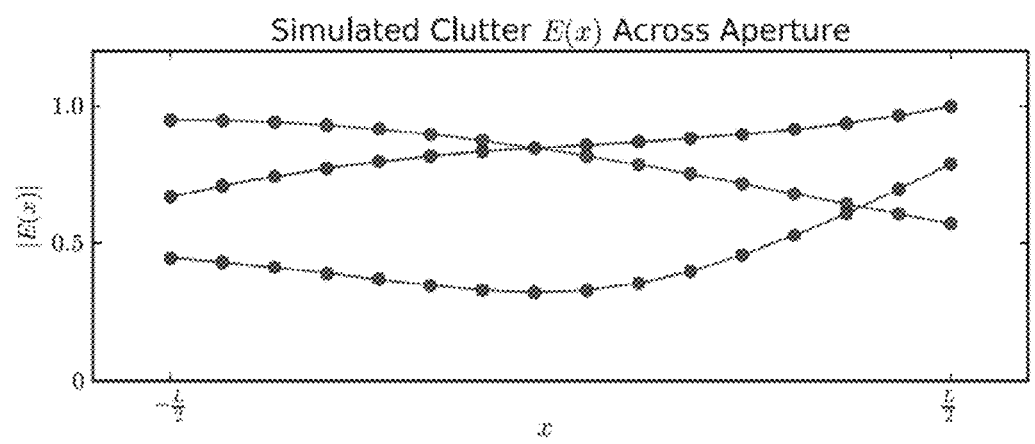
FIG. 7A illustrates numerical simulations of the electric field in the aperture for typical SuperDARN operating parameters.
Figure 7B:
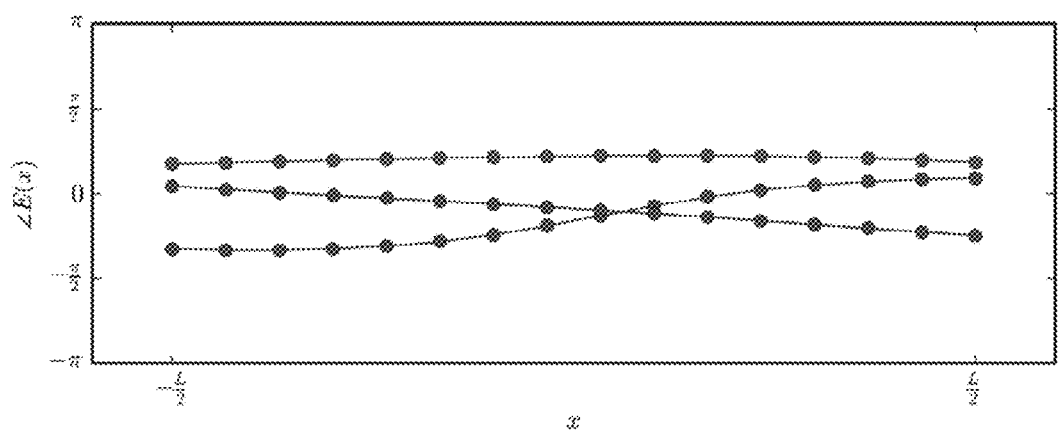
FIG. 7B illustrates numerical simulations of the electric field in the aperture for typical SuperDARN operating parameters.

Comparing (27) to (26) illustrates that each term in the vector summation is simply rotated by the phase path difference of $e^{jku_n\Delta}$. For the example radar described herein, the element spacing $\Delta$ is 15.24 (m), a typical wavelength is 30 (m), and the beamwidth is ~6.5° so that the maximum value of $u_n$ is ~3.25°. Hence, the largest rotation that a given term in the summation in (26) undergoes is $ku_n\Delta\cong10°$. Further, the terms that experience the largest rotation may contribute the least to the vector summation because they are weighted by the beam pattern of the radar. Therefore, while the field at a given point in the aperture is the vector summation of the response from a large number of scatterers, it is expected that the field at a neighboring point in the aperture will be very similar in amplitude and phase. Numerical simulations of the electric field in the aperture for typical SuperDARN operating parameters are illustrated in FIG. 7A and FIG. 7B. Note that the amplitude and phase are slowly varying as expected and typically in linear fashion. The discussion herein suggests that clutter targets under ideal conditions appear as well resolved point targets with perhaps a shift from the expected angle of incidence.

The upper performance bounds discussed above may be realized by correcting the phase and amplitude perturbations across the radar aperture produced by scintillation. Phase correction alone will be referred to as time delay correction in this disclosure. In an aspect, time delay correction is described as follows. Co-phasing of the randomly phase perturbed signal received at each antenna may be performed by applying a phase conjugate filter to each antenna element. Given an array of N elements each filter can be simply formed as, $$h_n=e^{j(\varphi_r-\varphi_n)}=e^{j\Delta\varphi_n} \quad (28)$$

where $\varphi_r$ is the angle at an arbitrary reference element and $\varphi_n$ is the angle of the element to be corrected. As the phase errors are a function of range gate, a total of N×M phase conjugate filters are required for an array of N elements and M range gates. It should be noted that application of (28) can force a flat phase response across the array which optimizes the angular resolution but translates the peak of the angular spectrum to zero. If it is desirable to optimize angular resolution but preserve the location of the peak in the angular spectrum, then the mean slope of the phase-conjugate filters in (28) can be removed as:

$$h_n = h_n e^{-jn\bar{\varphi}} \tag{29}$$

where $\bar{\varphi}$ is the mean slope of the phase conjugate filters calculated in (28). The mean slope of the phase conjugate filters can be obtained from a least-squares linear fit to the unwrapped phase.

For point targets, amplitude correction may also be performed by scaling the amplitude of the received signal at each antenna element to yield a wavefront with a uniform amplitude but equal amount of energy across the aperture. Correcting amplitude perturbations across the aperture can yields the maximum angular resolution, or equivalently can maximize the coherent summation of the received signal across the array. Specifically, the coherent summation of the spatial wavefront across the aperture can be, $$A_C = \int_{-L/2}^{L/2} A(x) dx \tag{30}$$

where L is the dimension of the aperture and A(x) is the (scalar) amplitude of the wavefront across the aperture. The energy in the spatial wavefront can be, $$E_A = \int_{-L/2}^{L/2} A^2(x) dx \tag{31}$$

It can be shown that the integral in (30) is maximized subject to the constraint that $E_A$ is constant when A(x) is uniform across the aperture, i.e., the incident wavefront is a plane wave as expected. An amplitude correction factor for the $n^{th}$ antenna element can be represented as, $$B_n = \left( \sqrt{\frac{E_A}{L}} \right) \frac{1}{A_n} \tag{32}$$

where $E_A$ is given by (31) and $A_n$ is the received (perturbed) amplitude at the $n^{th}$ antenna element. A complex correction factor that performs both phase and amplitude correction is given by the product of (28) and (32), i.e., $$h_n = \left( \sqrt{\frac{E_A}{L}} \right) \frac{1}{A_n} e^{j\Delta\varphi_n} \tag{33}$$

As discussed previously, the measured data presented in this disclosure contains primarily distributed targets. It has been shown that distributed targets produce a slowly-varying and typically linear phase profile across the radar aperture for the operating parameters of interest. However, the amplitude of distributed target echoes can also varies across the aperture which is in contrast to the uniform amplitude expected from a point target. These characteristics suggest that time-delay (phase) correction is valid for distributed targets but amplitude correction is not. In this disclosure, results for time-delay correction alone will be presented.

Adaptive Correction is described as follows. The conjugate filters in (28) may be evaluated from the first pulse in a CPI. However, the phase errors across the radar aperture will vary during the CPI. These changes to the phase profile may be tracked or predicted by appropriately filtering the time response of each $\Delta\varphi_n$. Given a filter impulse response l(k), the conjugate filters during the $k^{th}$ pulse interval may be expressed as, $$h_n(k) = e^{j(l(k)*\Delta\varphi_n(k))} \tag{34}$$

where the operator * is used to denote convolution. Application of time-delay correction in which the conjugate phase filters are updated after every pulse will be referred to as adaptive time-delay correction in this disclosure.

The data analyzed in this disclosure was collected at the Kodiak SuperDARN in the form of the lowpass in-phase (I) and quadrature (Q) samples at each antenna across the 16 element array for a given period of time. It should be noted that SuperDARN employs a transmit sequence of un-equally spaced pulses. The auto-correlation function of the slow time samples can then be calculated to eliminate range contamination and derive the spectral content of targets. However, the designed pulse contamination may not ideal for the some implementations of the present methods and systems. Instead, only the data from the first pulse in a transmit sequence may be used so that pulse repetition frequency (PRF) is actually the pulse sequence repetition frequency.

Figure 8A:
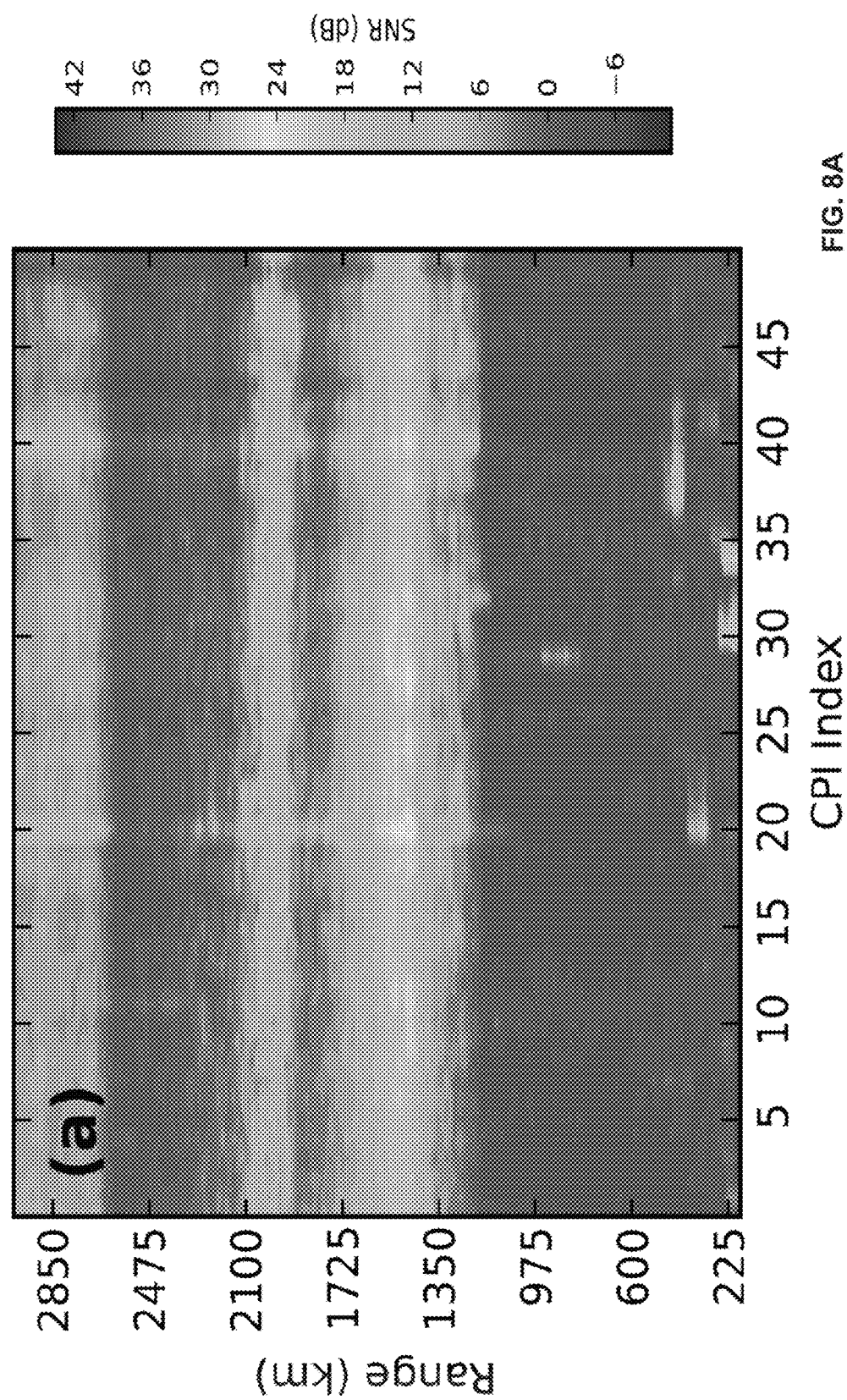
FIG. 8A is an RTI plot illustrating the use of incoherent summation across the array.
Figure 8B:
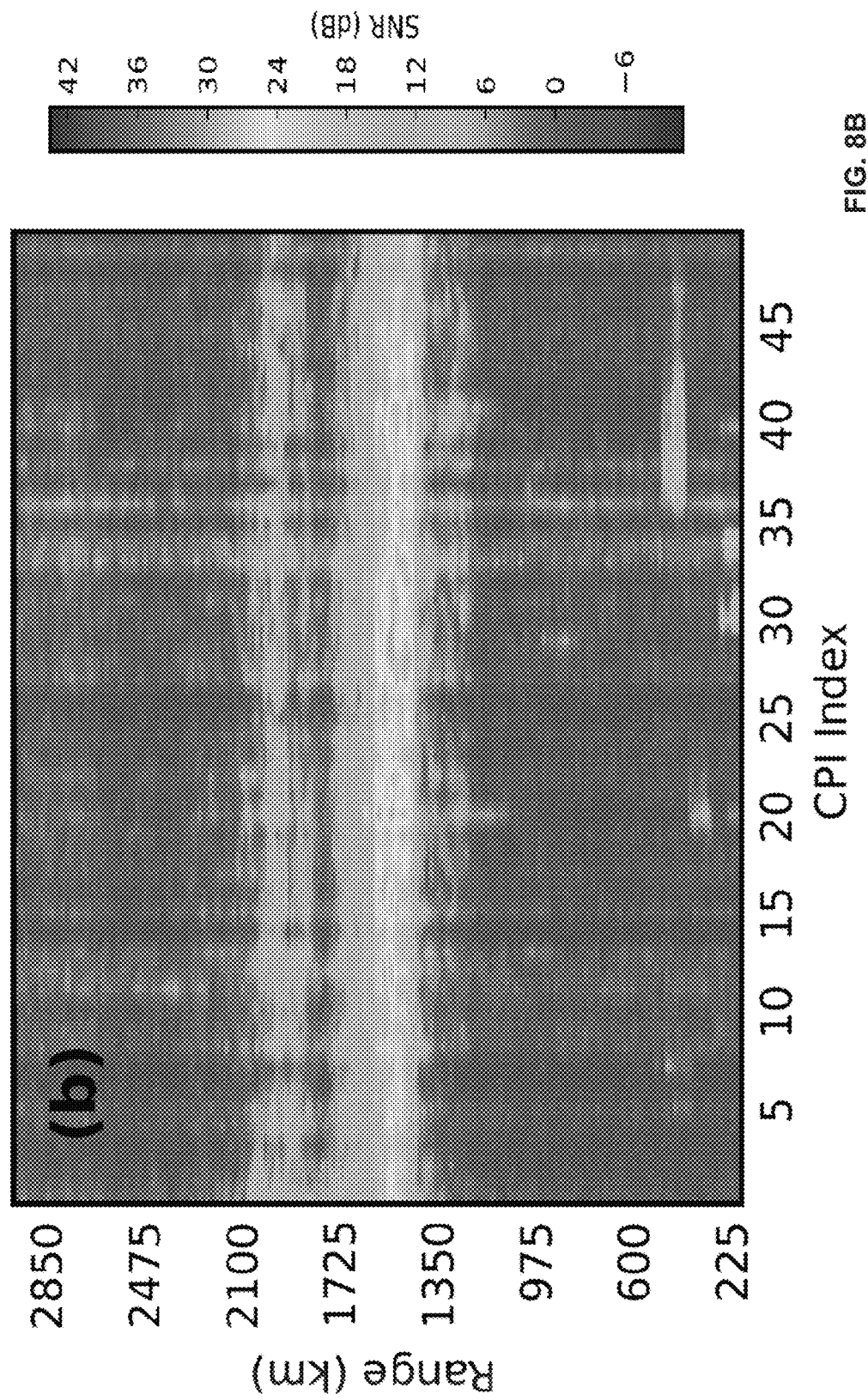
FIG. 8B is an RTI plot illustrating the use of conventional beamforming across the array.
Figure 8C:
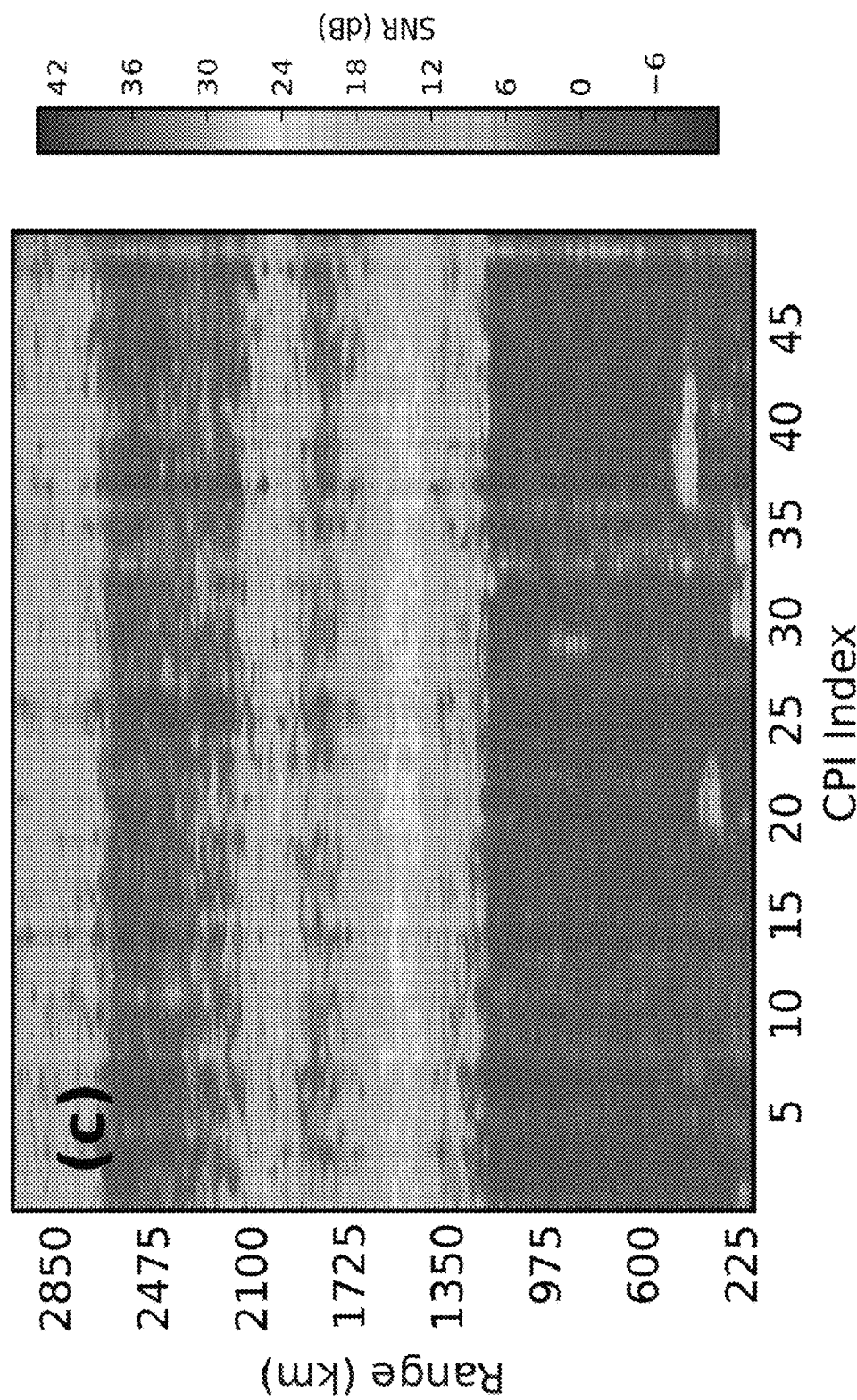
FIG. 8C is an RTI plot illustrating the use of static time-delay correction.
Figure 8D:
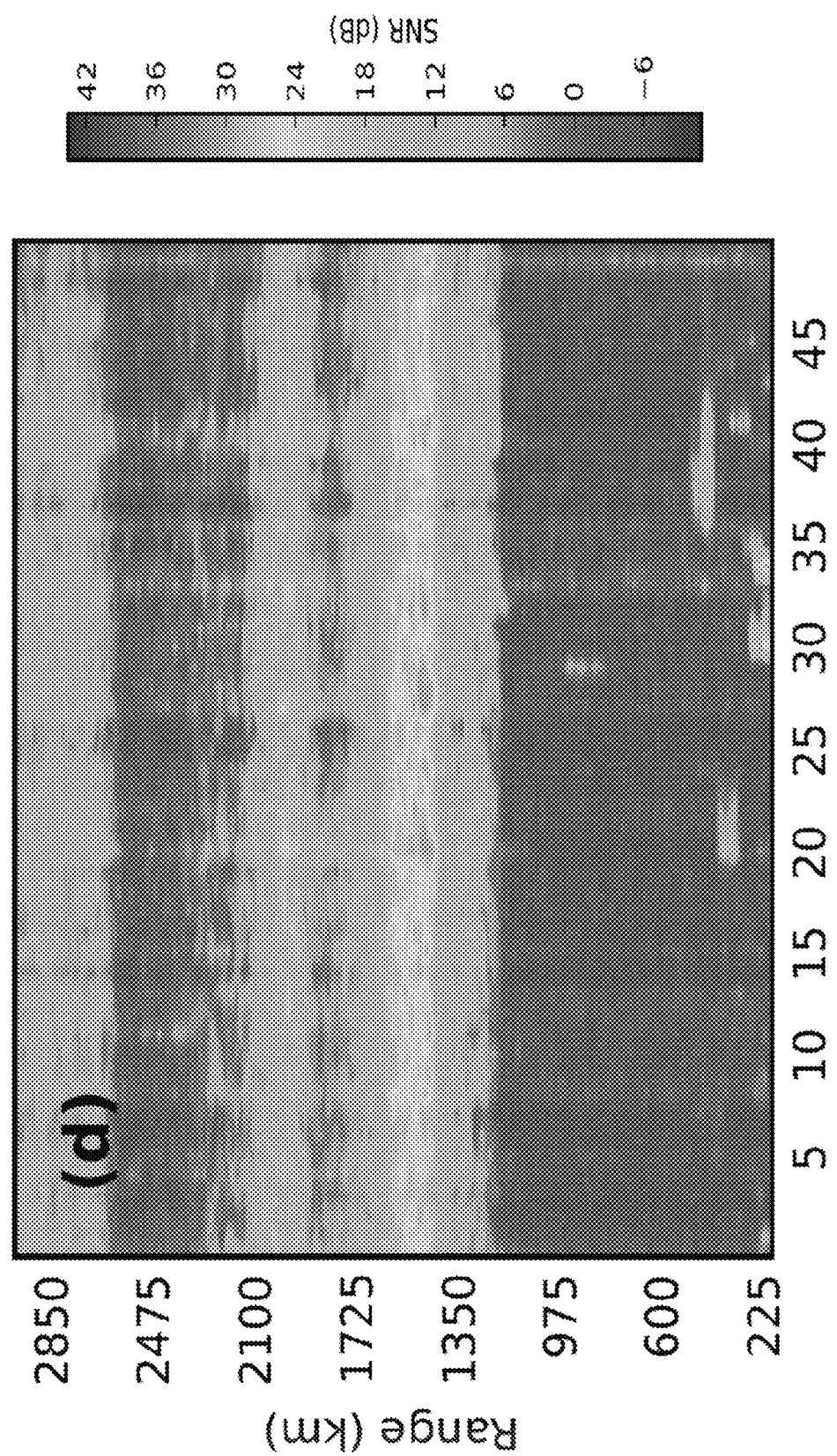
FIG. 8D is an RTI plot illustrating the use of adaptive time-delay correction.

Application of the adaptive time-delay correction algorithm can yields an improvement in SNR by forcing coherent summation across the array and maximizing the integration gain. The improvement in SNR is illustrated by a comparison of RTI plots over a 2 minute and 30 seconds interval generated using incoherent summation across the array, conventional beamforming across the array, and time-delay correction across the array as illustrated in FIG. 8A, FIG. 8B, FIG. 8C, and FIG. 8D. Point targets at near ranges are scatter from meteor trails while the return at ranges greater than 1300 (km) is ground clutter. FIG. 8A, FIG. 8B, FIG. 8C, and FIG. 8D are RTI plots evaluated over the same time-interval. The dimensions of pixels are integration period in the x-dimension and sampling rate in the y-dimension. FIG. 8A is an RTI plot illustrating the use of incoherent summation across the array. FIG. 8B is an RTI plot illustrating the use of conventional beamforming across the array. FIG. 8C is an RTI plot illustrating the use of static time-delay correction. FIG. 8D is an RTI plot illustrating the use of adaptive time-delay correction.

Several observations can be made from one or more of FIG. 8A, FIG. 8B, FIG. 8C, and FIG. 8D. To start with, note that the only range gates where conventional beamforming in FIG. 8B provides a visible enhancement of the signal over the incoherent case in FIG. 8A is in the range [1400, 1600](km). This indicates that the signal at other range gates is either scintillated, incident in a direction other than the transmit beam, or both.

FIG. 8C and FIG. 8D illustrate static and adaptive time-delay correction to the same time-interval. In static application of time-delay correction, filter coefficients in (28) can be calculated from the first pulse in an integration period and applied without change for the remainder of the period. In adaptive time-delay correction, a feedback loop can iteratively update the filter coefficients between pulses as in (30). In both FIG. 8C and FIG. 8D it is visibly apparent that time-delay correction provides an enhancement over the incoherent and conventional beamforming methods in FIG. 8A and FIG. 8B in most range bins. However, a comparison between RTI plots illustrates the effect of $\tau_{coh} < T_{CPI}$, particularly in the region between [1400, 1600](km). Specifically, the speckled quality of the RTI plot in FIG. 8C demonstrates that the time-delay correction calculated from the first pulse in an integration interval is not adequate by the last pulse. In contrast, applying time-delay correction adaptively results in the smoother RTI plot in FIG. 8D.

Figure 9:
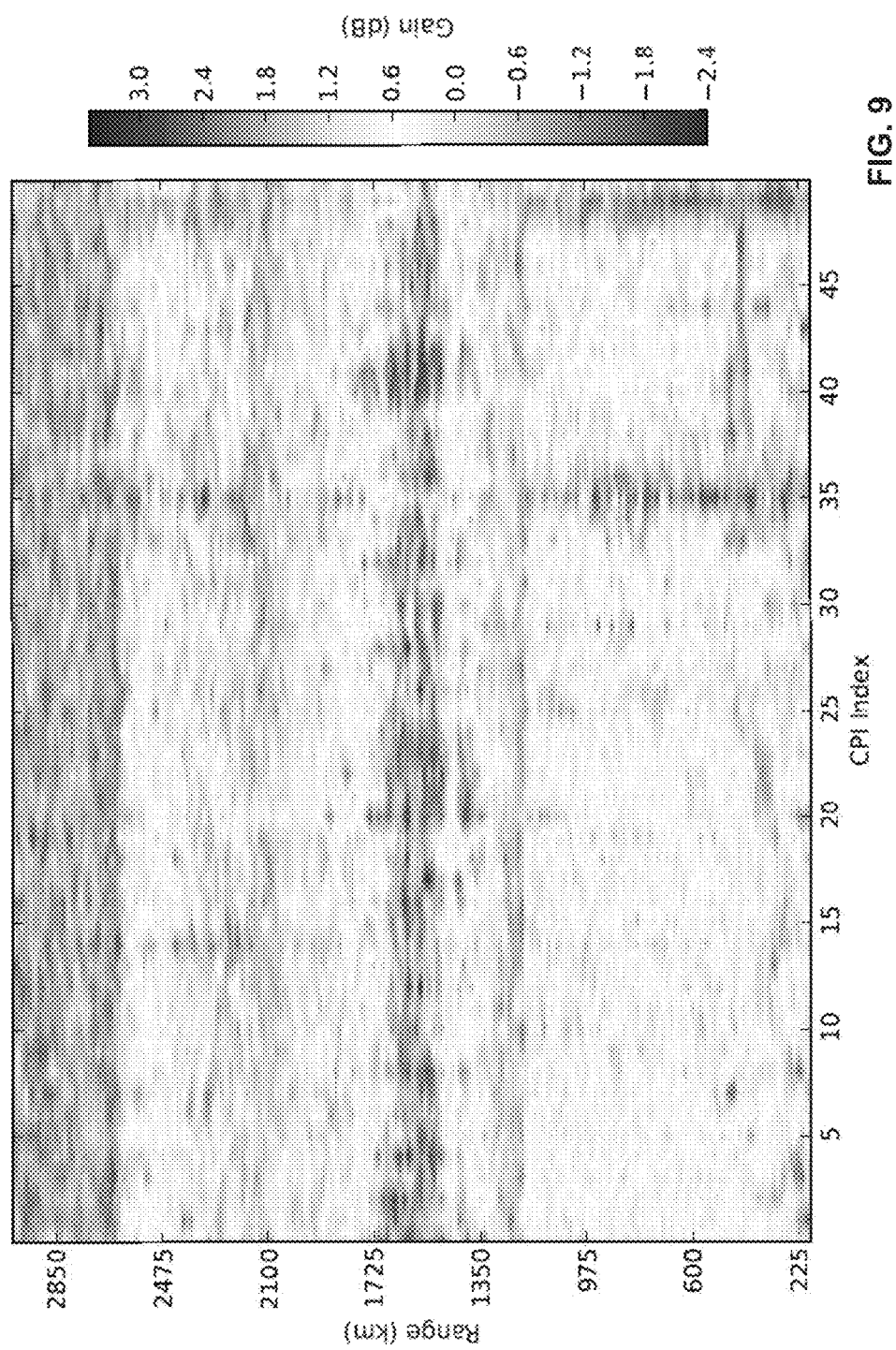
FIG. 9 illustrates gain achieved by time-delay correction with respect to the unprocessed, incident wavefront across the array.

The RTI plots in FIG. 8B, FIG. 8C, and FIG. 8D illustrate the SNR obtained by sampling the array angular spectrum in the beam direction. Ideally, application of time-delay correction can compress the angular spectrum by correcting for phase ripples across the wavefront. In the event that the wavefront is incident at an angle near the beam direction, the compression of the angular spectrum can result in a higher value of SNR. However, if the wavefront is incident at an angle significantly offset from the beam direction, e.g., outside the first-null beamwidth, then angular compression may remove energy from the spectrum in the direction of the transmit beam. As shown in one or more of FIG. 8A. FIG. 8B, FIG. 8C, FIG. 8D, this effect is evident in RTI cells between [1400, 1600](km) where geometric beamforming outperforms time-delay correction. Conversely, if the time-delay correction algorithm is unable to track changes in the scintillated wavefront sufficiently fast then application of the phase conjugate filters spreads rather than compresses the angular spectrum which may or may not enhance the SNR when the angular spectrum is sampled in the beam direction. To best illustrate range cells where time-delay correction effectively compresses the angular spectrum by correcting scintillation in the incident wavefront, the peak of the angular spectrum before and after time-delay correction is calculated and the gain in SNR is presented in FIG. 9. FIG. 9 illustrates gain achieved by time-delay correction with respect to the unprocessed, incident wavefront across the array.

There are two regions in the RTI plot of FIG. 9 where time-delay correction has a discernible effect. The first is the range [1400, 1600](km) where application of the algorithm produces a gain of 2-4 dB by compensating for $l_{coh} < l_{array}$ and $\tau_{coh} < T_{CPI}$. However, for clutter at ranges greater than 2600 (km) time-delay correction results in a loss of 1-2 dB in comparison to sampling the peak of the angular spectrum prior to applying the algorithm. This implies that the wavefront scintillation changes more rapidly between sampling times than the phase-conjugate filters are capable of tracking and applying the filters actually spreads the spectrum. Interestingly, a comparison of the RTI plots in FIG. 8B and FIG. 8D demonstrates that this spreading happens to produces a larger SNR in the beam direction. For near range meteor echoes, the time-delay correction does not produce a significant effect with a gain typically in the range [−1, 1] decibel.

Figure 10A:
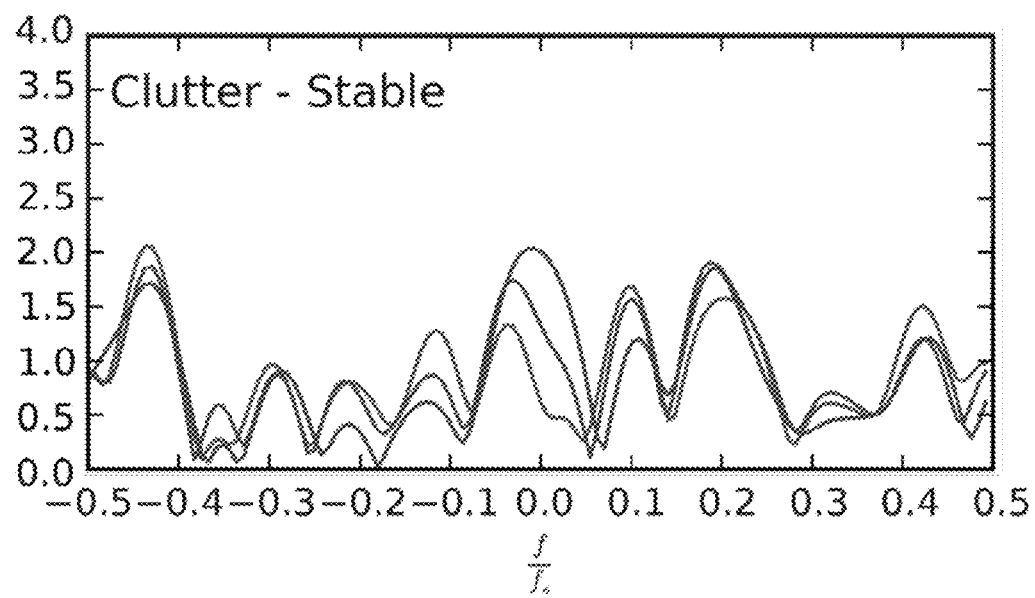
FIG. 10A illustrates angular spectrum of unprocessed data for a stable clutter cell.
Figure 10B:
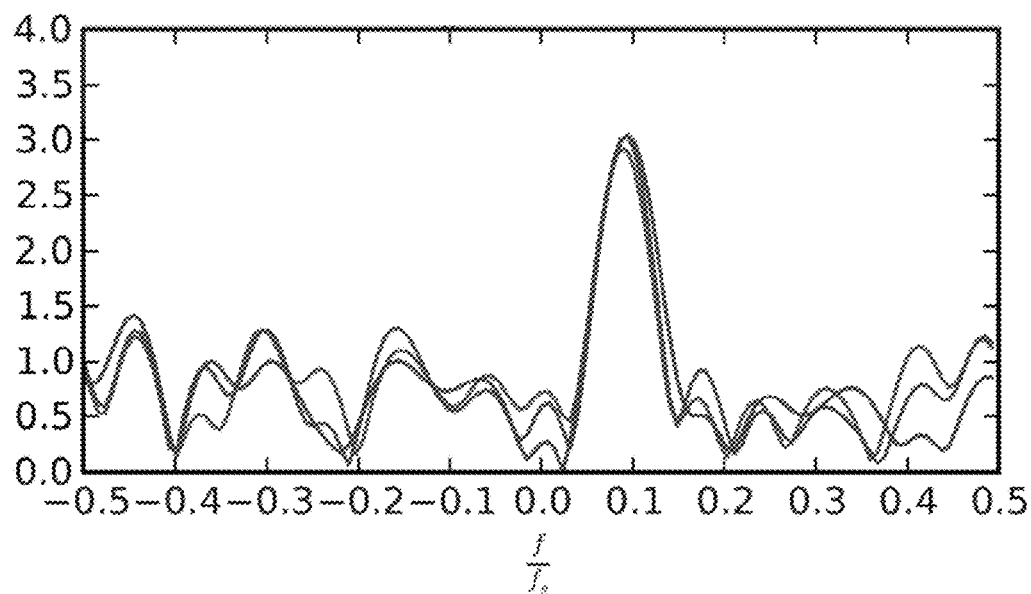
FIG. 10B illustrates angular spectrum of corrected data for a stable clutter cell.
Figure 10C:
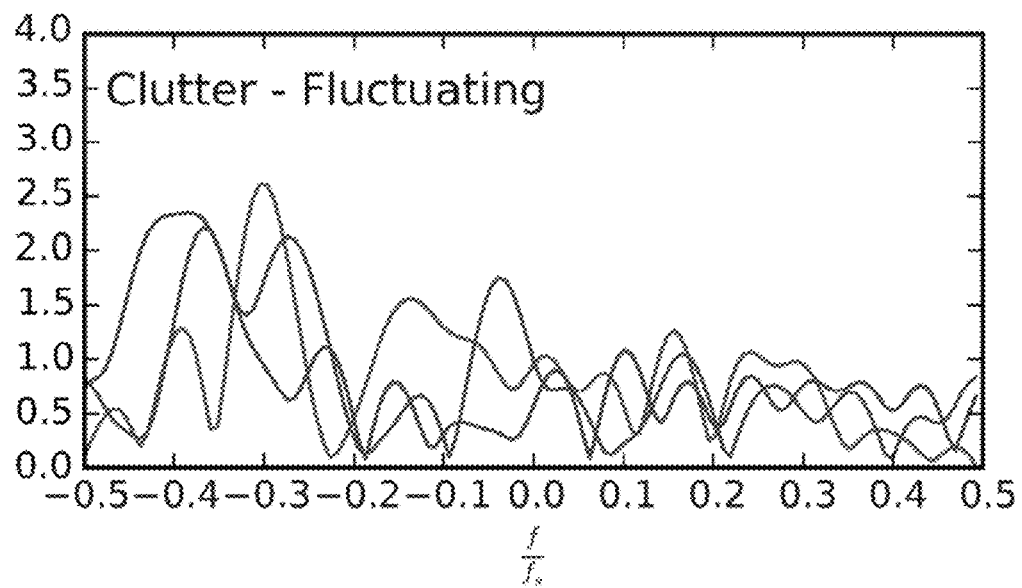
FIG. 10C illustrates angular spectrum of unprocessed data for a fluctuating clutter cell.
Figure 10D:
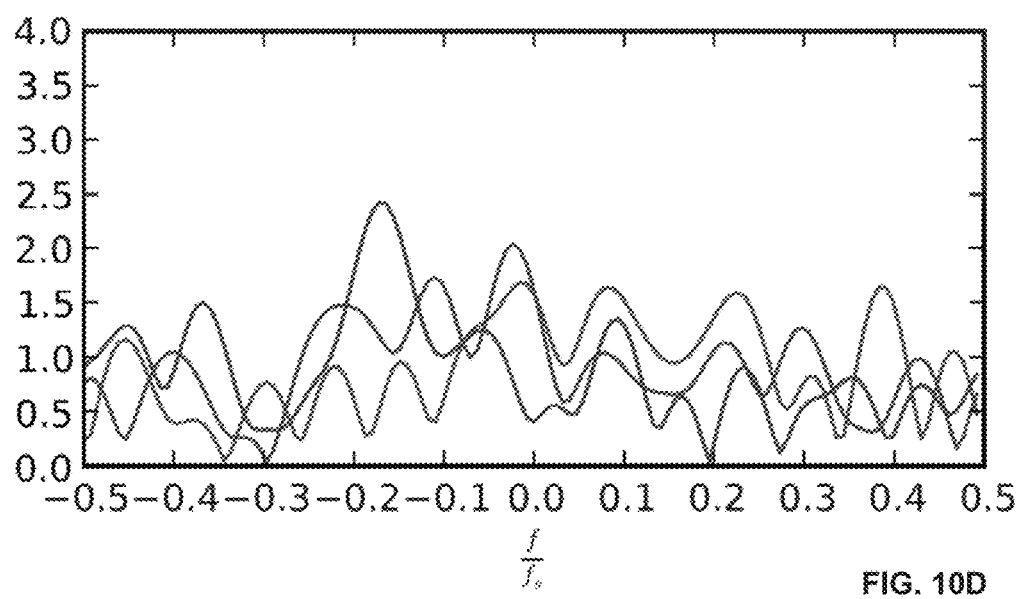
FIG. 10D illustrates angular spectrum of corrected data for a fluctuating clutter cell.
Figure 10E:
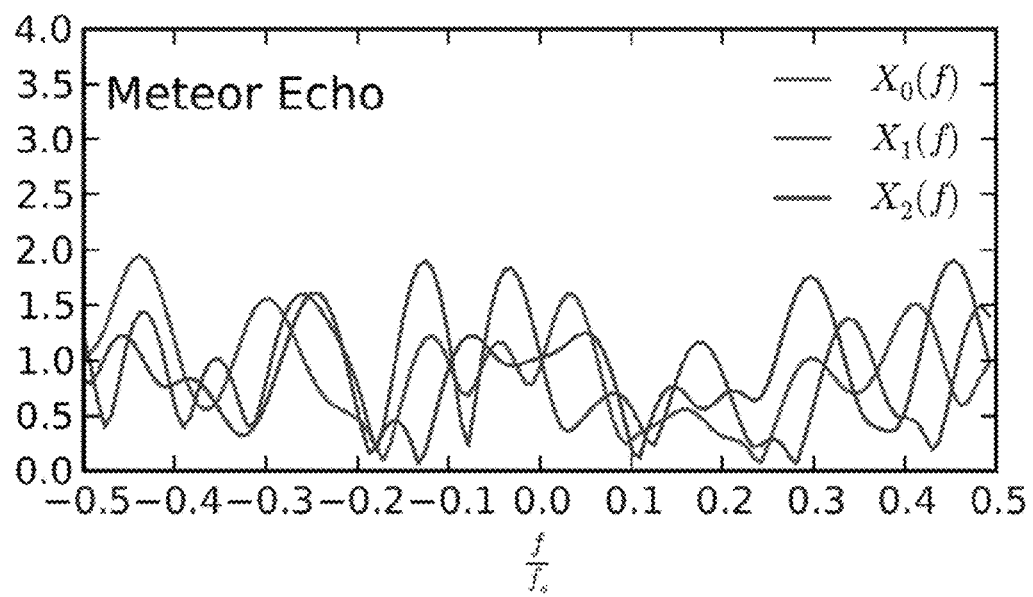
FIG. 10E illustrates angular spectrum of unprocessed data for a meteor echo.
Figure 10F:
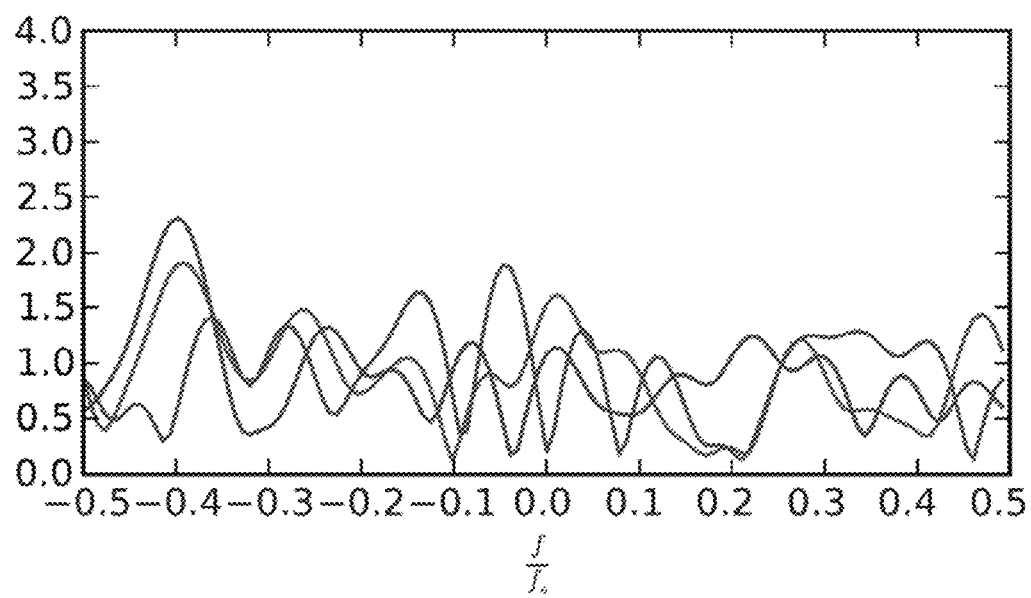
FIG. 10F illustrates angular spectrum of corrected data for a meteor echo.

Further insight can be gained by comparing consecutive samples of the angular spectrum for individual targets. FIG. 10A, FIG. 10B. FIG. 10C, FIG. 10D, FIG. 10E, and FIG. 10F illustrate comparison of angular spectrum from consecutive looks at three different targets. The FIG. 10A, FIG. 10C, and FIG. 10E illustrates the angular spectrum of the unprocessed data and the FIG. 10B, FIG. 10D, and FIG. 10F illustrate the angular spectrum of the time-delay correction processed data.

FIG. 10A (unprocessed data) and FIG. 10B (time delay correction) illustrate consecutive samples within a CPI of the array angular spectrum of unprocessed and time-delay corrected data for a stable clutter cell. FIG. 10C (unprocessed data) and FIG. 10D (time delay correction) illustrate consecutive samples within a CPI of the array angular spectrum of unprocessed and time-delay corrected data for a fluctuating clutter cell. FIG. 10E (unprocessed data) and FIG. 10F (time delay correction) illustrate consecutive samples within a CPI of the array angular spectrum of unprocessed and time-delay corrected data for a meteor echo. Examining the unprocessed angular spectrum of the stable clutter target in FIG. 10A, and FIG. 10B illustrates that the spectrum is not well resolved, i.e. the incident wavefront is scintillated, but that variations in the spectrum are small between sampling times. This is the ideal case for application of time-delay correction as demonstrated by the corresponding time-delay corrected samples of the spectrum in which phase conjugate filtering successfully compresses the spectrum and tracks variations between sampling times. However, examining the unprocessed angular spectrum of the fluctuating clutter target in FIG. 10C and FIG. 10D illustrates that not only is each sample of the spectrum not well resolved, but that the spectrum changes significantly between sampling times. Consequently, the corresponding time-delay corrected samples of the spectrum often show spreading rather than compression as the phase conjugate filters are unable to track the rapid spectral fluctuations. Similar results occur for the case of the meteor echo in FIG. 10E and FIG. 10F with sequential samples of the unprocessed angular spectrum rapidly fluctuating and the time-delay corrected samples of the spectrum featuring spreading rather than compression. An explanation for the rapid angular spectrum variations of the meteor echo and some clutter targets are variations in the radar cross section (RCS) and the propagation channel respectively. For meteor echoes, the fact that the fast-time signal received has the same form as the transmitted signal indicates that the target is physically small with respect to the transmit pulse. However, rapid fluctuations in the angular spectrum between sampling times indicates that either the channel and/or the target RCS is rapidly fluctuating. Given that most meteor echoes are found at near ranges, it is likely the latter and that the distortion in the angular spectrum is due in part to geometric decorrelation or glint and the variation between sampling times may be due to a change in position or illumination of the target. For ground clutter echoes, evidence was provided herein that the wavefront under ideal conditions is slowly varying and typically linear across the spatial extent of the array. This suggests that the substantial differences in the observed angular spectrum between sampling times for distant clutter cells as illustrated in FIG. 10C is due to changes in the propagation channel between sampling times. FIG. 9 as well as FIG. 10A, FIG. 10B, FIG. 10C, FIG. 10D, FIG. 10E, and FIG. 10F illustrate that the variations in the angular spectrum caused by the channel and the subsequent change in illumination of the target are slow enough to be corrected for many clutter cells but that the problem becomes more challenging with range.

Figure 11A:
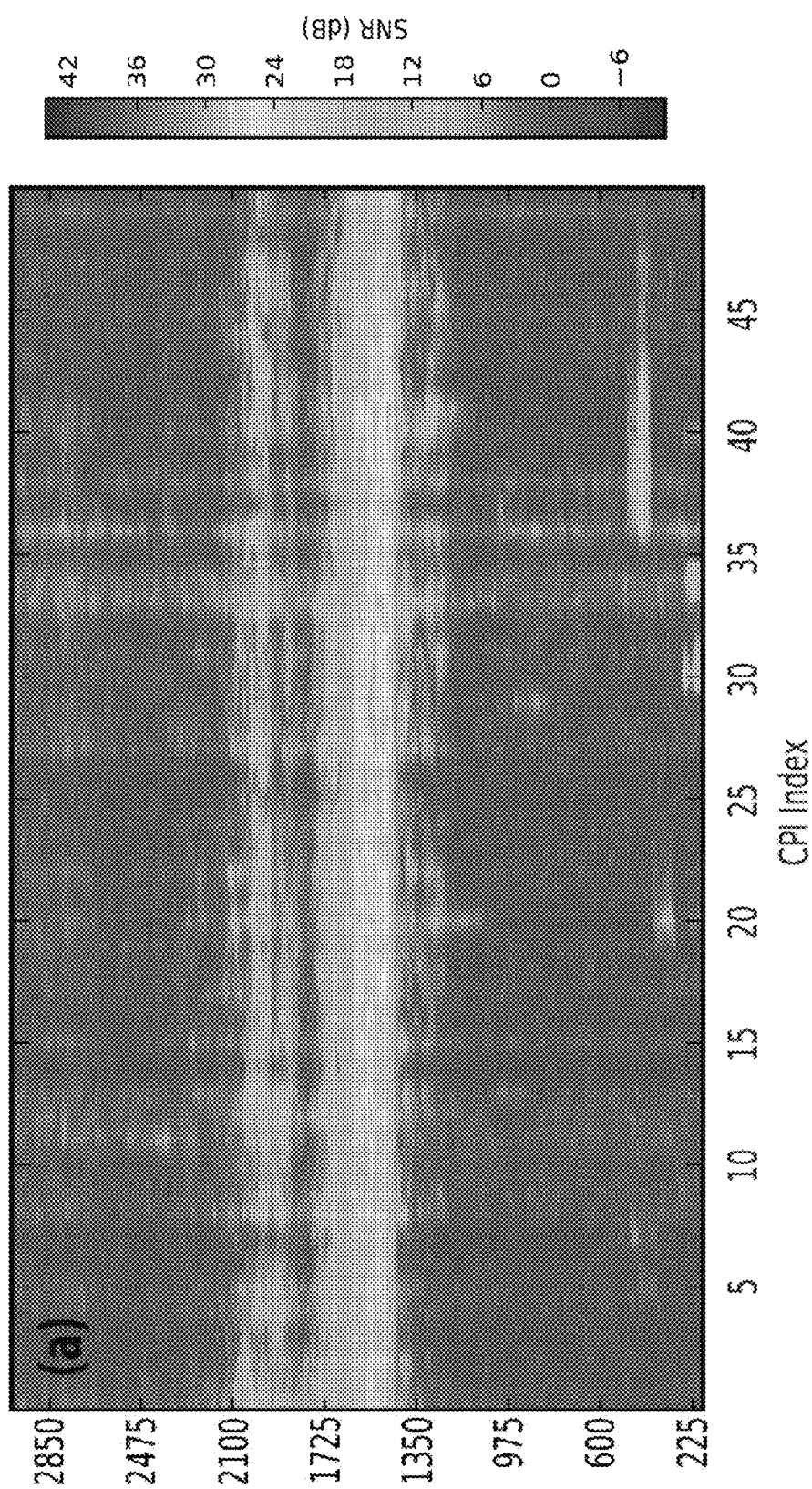
FIG. 11A illustrates an RTI plot of conventional beamforming.
Figure 11B:
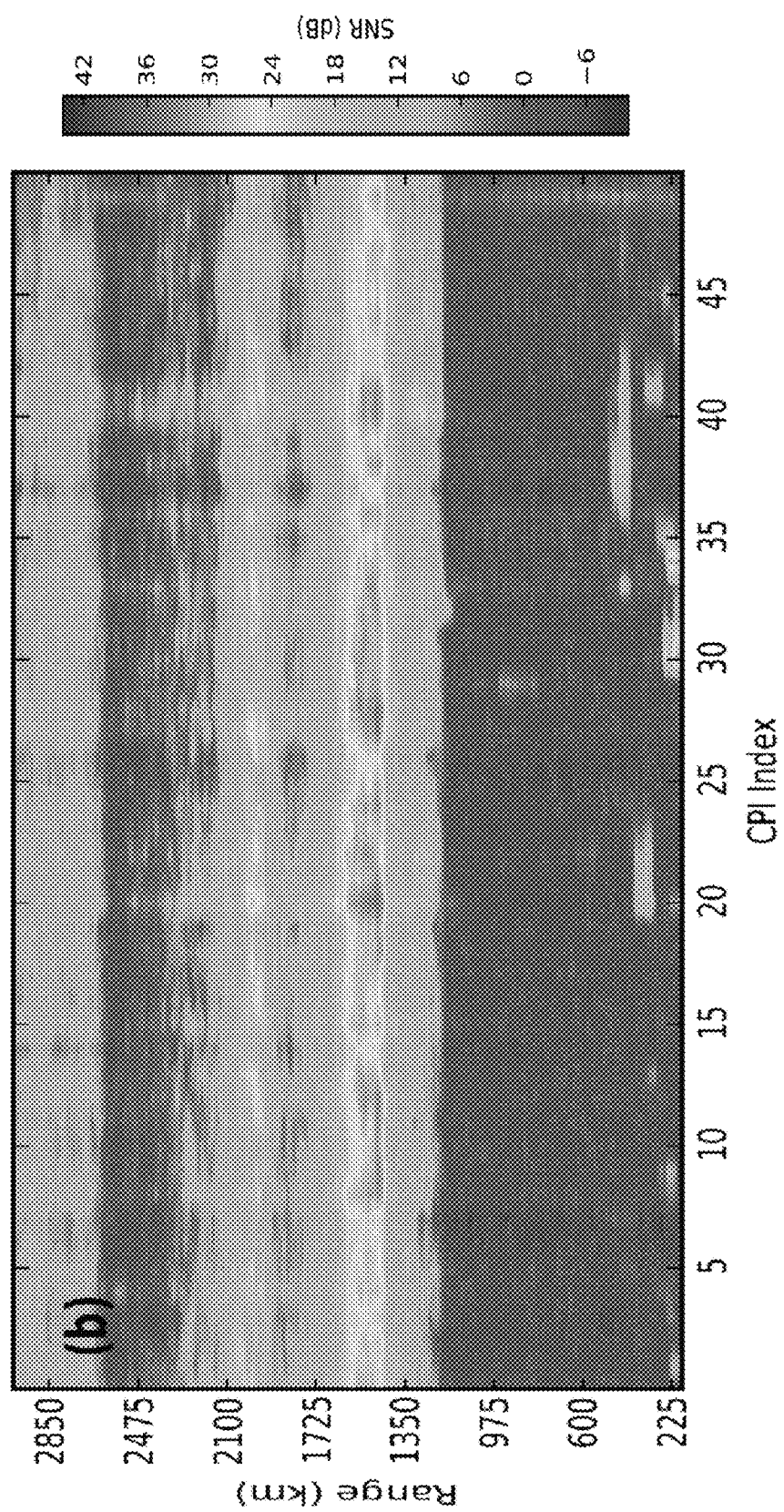
FIG. 11B illustrates an RTI plot in which time-delay correction and sampling the peak of the angular spectrum are applied.

As discussed herein, many SuperDARN targets are complex and/or distributed so the incident waveform across the array may vary due to geometric decorrelation. Evidence was provided that the electric field across the aperture due to a clutter target is likely slowly-varying and linear. If the objective of an experiment is to image clutter which is a stable, stationary, target than the apparent changes in incidence angle over time caused by geometric decorrelation may not convey information about a change in the position of the target but rather in how the target is illuminated. Therefore, to get the brightest image an AO algorithm can be applied and the angular spectrum can be sampled at the peak value. This type of algorithm may be applied when the goal is to infer ionospheric properties from the ground clutter profile. FIG. 11A and FIG. 11B illustrates a RTI comparison of this algorithm with conventional beamforming for the same time interval as the plots in FIG. 8A, FIG. 8B, FIG. 8C, and FIG. 8D and reveals a dramatic improvement in the intensity and smoothness of the image. FIG. 11A illustrates an RTI plot of conventional beamforming. FIG. 1B illustrates an RTI plot in which time-delay correction and sampling the peak of the angular spectrum are applied.

The application of AO algorithms to the data presented here was significantly limited by both low values of PRF (~0.3 (s)) and a low CPI period (~3 (s)). As illustrated in one or more of FIG. 9, FIG. 10A, FIG. 10B, FIG. 10C, FIG. 10D, FIG. 10E, and FIG. 10F, the low PRF was often insufficient to track changes in the wavefront for meteor echoes and distant clutter targets. Similarly, a relatively short CPI resulted in too few samples per period to implement a more elaborate feedback loop or predictive filtering for updating filter coefficients as operating parameters such as frequency typically change every CPI.

In this study, the application of AO algorithms to HF phased array radar has been presented. The results demonstrate that the correction of scintillation in the incident wavefront provides an improvement of several decibels in SNR which in turn improves the angular, time, range, and Doppler frequency resolution of measurements. In addition, the analysis here indicates that a drastic improvement in ground clutter imaging is obtained by applying an AO algorithm and sampling the angular spectrum across the array at it's peak which maximizes the observed SNR at the expense of retaining information about geometric decorrelation. The performance of the algorithms implemented was limited by operating parameters specific to SuperDARN and future work will investigate the performance that can be achieved without the constraints imposed under normal operation.

Figure 12:
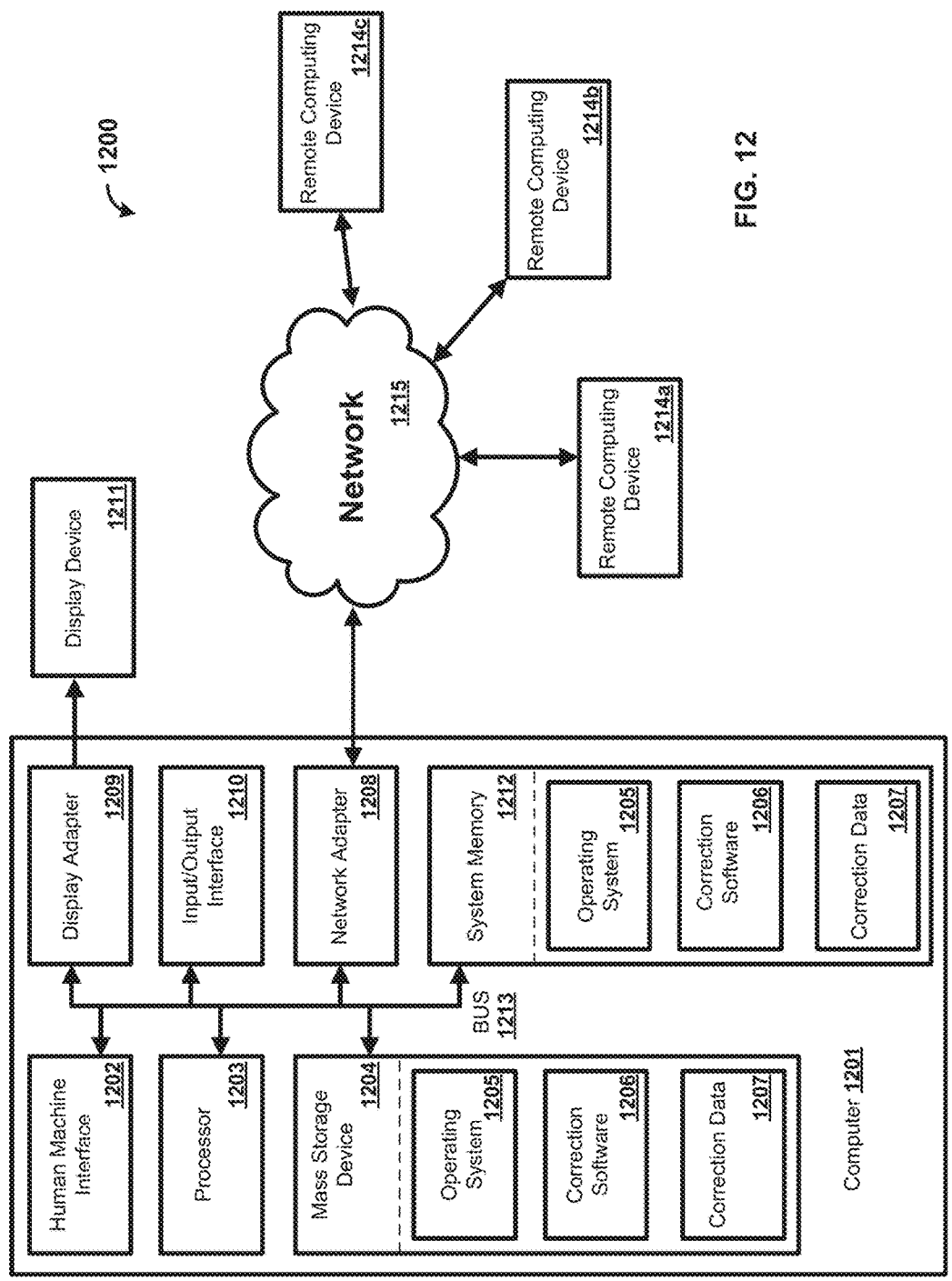
FIG. 12 is a block diagram illustrating an example computing device in which the present methods and systems can operate.

In an exemplary aspect, the methods and systems can be implemented on a computer 1201 as illustrated in FIG. 12 and described below. By way of example, the first device 104 and/or second device 106 of FIG. 1 can be a computers as illustrated in FIG. 12. Similarly, the methods and systems disclosed can utilize one or more computers to perform one or more functions in one or more locations. FIG. 12 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1201. The components of the computer 1201 can comprise, but are not limited to, one or more processors 1203, a system memory 1212, and a system bus 1213 that couples various system components including the one or more processors 1203 to the system memory 1212. In an aspect, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 1213, and all buses specified in this description can also be implemented over a wired or wireless network connection and each of the subsystems, including the one or more processors 1203, a mass storage device 1204, an operating system 1205, correction software 1206, correction data 1207, a network adapter 1208, system memory 1212, an Input/Output Interface 1210, a display adapter 1209, a display device 1211, and a human machine interface 1202, can be contained within one or more remote computing devices 1214a,b,c at physically separate locations, connected through buses of this form, in effect implementing a fully distributed system.

The computer 1201 typically comprises a variety of computer readable media. Exemplary readable media can be any available media that is accessible by the computer 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as correction data 1207 and/or program modules such as operating system 1205 and correction software 1206 that are immediately accessible to and/or are presently operated on by the one or more processors 1203.

In another aspect, the computer 1201 can also comprise other removable/non-removable, volatile/non-volatile computer storage media. By way of example, FIG. 12 illustrates a mass storage device 1204 which can provide non-volatile storage of computer code, computer readable instructions, data structures, program modules, and other data for the computer 1201. For example and not meant to be limiting, a mass storage device 1204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1204, including by way of example, an operating system 1205 and correction software 1206. Each of the operating system 1205 and correction software 1206 (or some combination thereof) can comprise elements of the programming and the correction software 1206. Correction data 1207 can also be stored on the mass storage device 1204. Correction data 1207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1203 via a human machine interface 1202 that is coupled to the system bus 1213, but can be connected by other interface and bus structures, such as a parallel port, game port, an IEEE 1394 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computer 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computer 1201 via Input/Output Interface 1210. Any step and/or result of the methods can be output in any form to an output device. Such output can be any form of visual representation, including, but not limited to, textual, graphical, animation, audio, tactile, and the like. The display device 1211 and computer 1201 can be part of one device, or separate devices.

The computer 1201 can operate in a networked environment using logical connections to one or more remote computing devices 1214a,b,c. By way of example, a remote computing device can be a personal computer, portable computer, smartphone, a server, a router, a network computer, a peer device or other common network node, and so on. Logical connections between the computer 1201 and a remote computing device 1214a,b,c can be made via a network 1215, such as a local area network (LAN) and/or a general wide area network (WAN). Such network connections can be through a network adapter 1208. A network adapter 1208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1205 are illustrated herein as discrete blocks, although it is recognized that such programs and components reside at various times in different storage components of the computer 1201, and are executed by the data processor(s) of the computer. An implementation of correction software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for correcting environmental distortion, comprising:
   (a) receiving a first plurality of signals sampled from a range cell in space at a first time;
   (b) determining a first plurality of correction factors based on the first plurality of signals and one or more phase-conjugate filters, wherein the first plurality of correction factors are configured to correct environmental distortion in the first plurality of signals;

(c) correcting the first plurality of signals by applying the first plurality of correction factors to the first plurality of signals thereby compressing angular spectra associated with the first plurality of signals and generating a corrected first plurality of signals; and (d) repeating steps (a)-(c) for one or more additional pluralities of signals sampled in space at times subsequent to the first time with corresponding additional pluralities of correction factors, wherein each additional plurality of correction factors is unique to a corresponding plurality of signals of the one or more additional pluralities of signals.

2. The method of claim 1, wherein the first plurality of signals and the one or more additional pluralities of signals are received by a phased antenna array.

3. The method of claim 1, wherein each additional plurality of correction factors is based on correction factors of a previous iteration.

4. The method of claim 1, wherein the environmental distortion in the first plurality of signals is different from the environmental distortion in each of the one or more additional pluralities of signals.

5. The method of claim 1, wherein each additional pluralities of correction factors is determined by estimating each of the additional pluralities of correction factors based on one or more pluralities of correction factors determined at a time prior to the additional plurality of correction factors being estimated.

6. The method of claim 1, wherein the first plurality of correction factors is selected to correct for differences in phase and amplitude among the first plurality of signals.

7. The method of claim 1, wherein the first plurality of correction factors are configured to correct for time-varying environmental distortion.

8. The method of claim 1, further comprising transmitting a radio signal pulse, wherein the first plurality of signals and the one or more additional pluralities of signals are reflections of the radio signal pulse sampled in space and time.

9. A method for correcting environmental distortion, comprising:

(a) transmitting a signal;

(b) receiving N×M signals reflected based on the transmitted signal, wherein the N×M signals are received at N points in space and M points in time, wherein each M point in time corresponds to a reflection of the signal from a different range cell volume of space;

(c) determining, based on one or more phase-conjugate filters, N×M correction factors comprising N correction factors for each of the M points in time, and wherein the N×M correction factors are configured to correct for time-varying environmental distortion specific to each of M range cell volumes of space that produces amplitude and phase variations between each of the N points in space;

(d) correcting the N×M signals by applying the N×M correction factors to corresponding signals of the N×M signals thereby compressing angular spectra associated with the N×M signals and generating a corrected set of signals; and (e) repeating (a)-(d) to thereby update the N×M correction factors for each iteration to adaptively compensate for the time-varying environmental distortion of each iteration.

10. The method of claim 9, wherein the transmitted signal is a RADAR signal, and wherein the N×M signals are RADAR echoes sampled at the N points in space and the M points in time.

11. The method of claim 9, wherein the N×M correction factors are updated for each iteration based on the N×M signals received during the iteration and one or more sets of N×M signals received prior to the iteration.

12. The method of claim 9, wherein the N×M correction factors comprise M sets of N complex correction factors, wherein each of the M sets of N complex correction factors is selected to correct for amplitude and phase differences in a received signal at the N points in space, and wherein the N×M correction factors are selected to correct for M different received signals corresponding to M reflections of a transmit pulse from M unique volumes of space.

13. The method of claim 9, wherein the N×M signals are reflections of a transmitted radio signal from different volumes of space at N spatially separated antennas.

14. A system, comprising:

at least two spatially separated antennas; and a signal processor coupled to the at least two spatially separated antennas, wherein the signal processor is configured for:

(a) receiving N×M signals from at least a portion of the at least two spatially separated antennas, wherein the N×M signals are received at N points in space and M points in time, wherein each M point in time corresponds to a reflection of a signal from a different range cell volume of space, (b) determining, based on one or more phase-conjugate filters, N×M correction factors comprising N correction factors for each of the M points in time, and wherein the N×M correction factors are configured to correct for time-varying environmental distortion specific to each of M volumes of space and that produces phase and amplitude variation between each of the N points in space, (c) correcting the N×M signals by applying the N×M correction factors to corresponding signals of the N×M signals thereby compressing angular spectra associated with the N×M signals and generating a corrected set of signals, and (d) repeating (a)-(c) to thereby update the N×M correction factors for each iteration to adaptively compensate for the time-varying environmental distortion of each iteration.

15. The system of claim 14, wherein the at least two spatially separated antennas are configured to transmit a RADAR signal, and wherein the N×M signals are RADAR echoes sampled at the N points in space and the M points in time.

16. The system of claim 14, wherein signal processor is further configured to provide the corrected set of signals.

17. The system of claim 14, wherein the N×M correction factors comprise N complex factors for each of the corresponding M points in time, wherein the N complex factors are selected to correct for amplitude and phase differences between the signals received at the N points in space.

* * * * *